Figure 1:
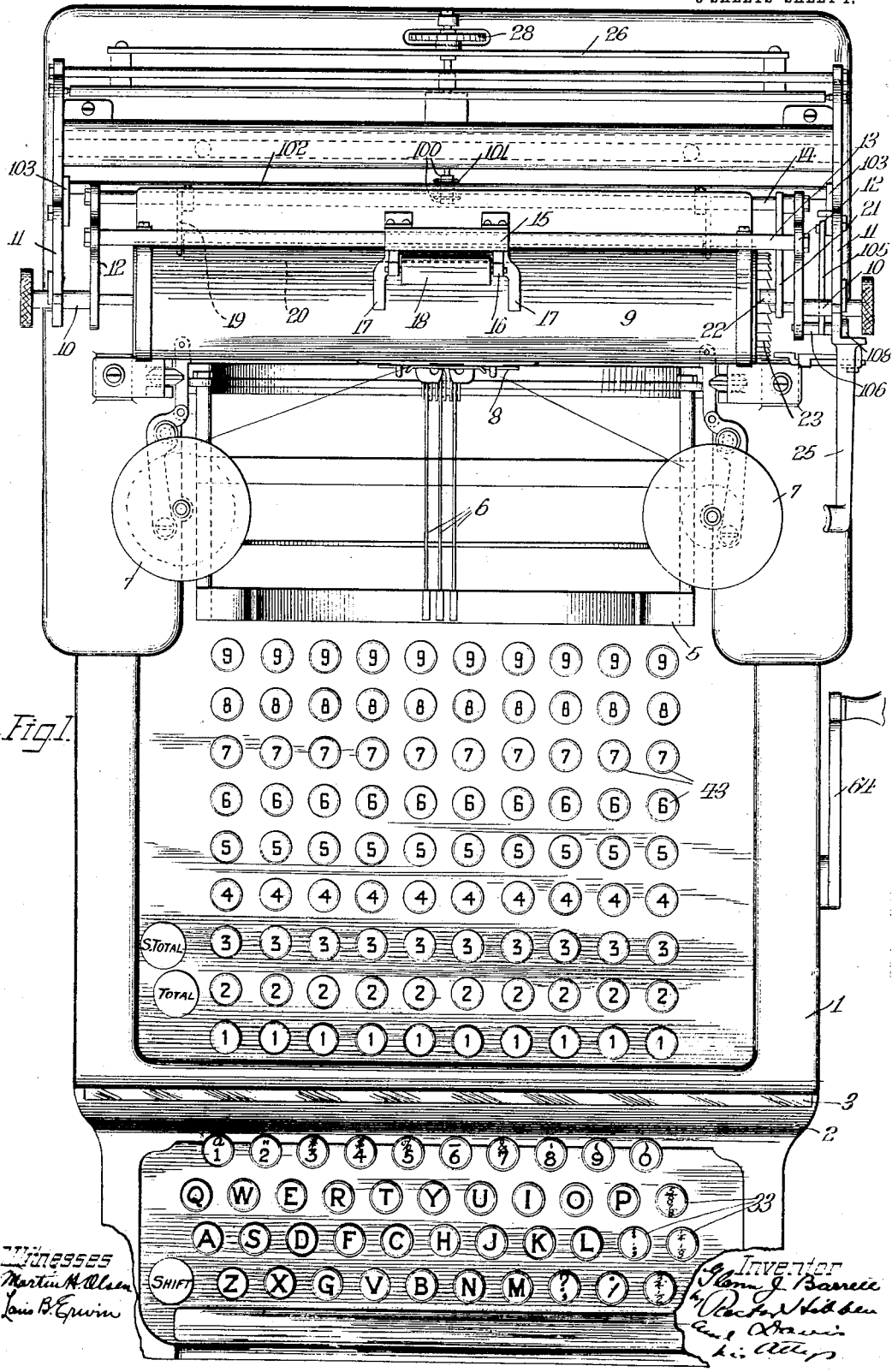

G. J. BARRETT.
COMBINED TYPE WRITING AND AMOUNT LISTING MACHINE.
APPLICATION FILED DEC. 4, 1906.

972,150.

Patented Oct. 11, 1910.

8 SHEETS—SHEET 1.

G. J. BARRETT.
COMBINED TYPE WRITING AND AMOUNT LISTING MACHINE.
APPLICATION FILED DEC. 4, 1906.
972,150.
Patented Oct. 11, 1910.
8 SHEETS—SHEET 2.
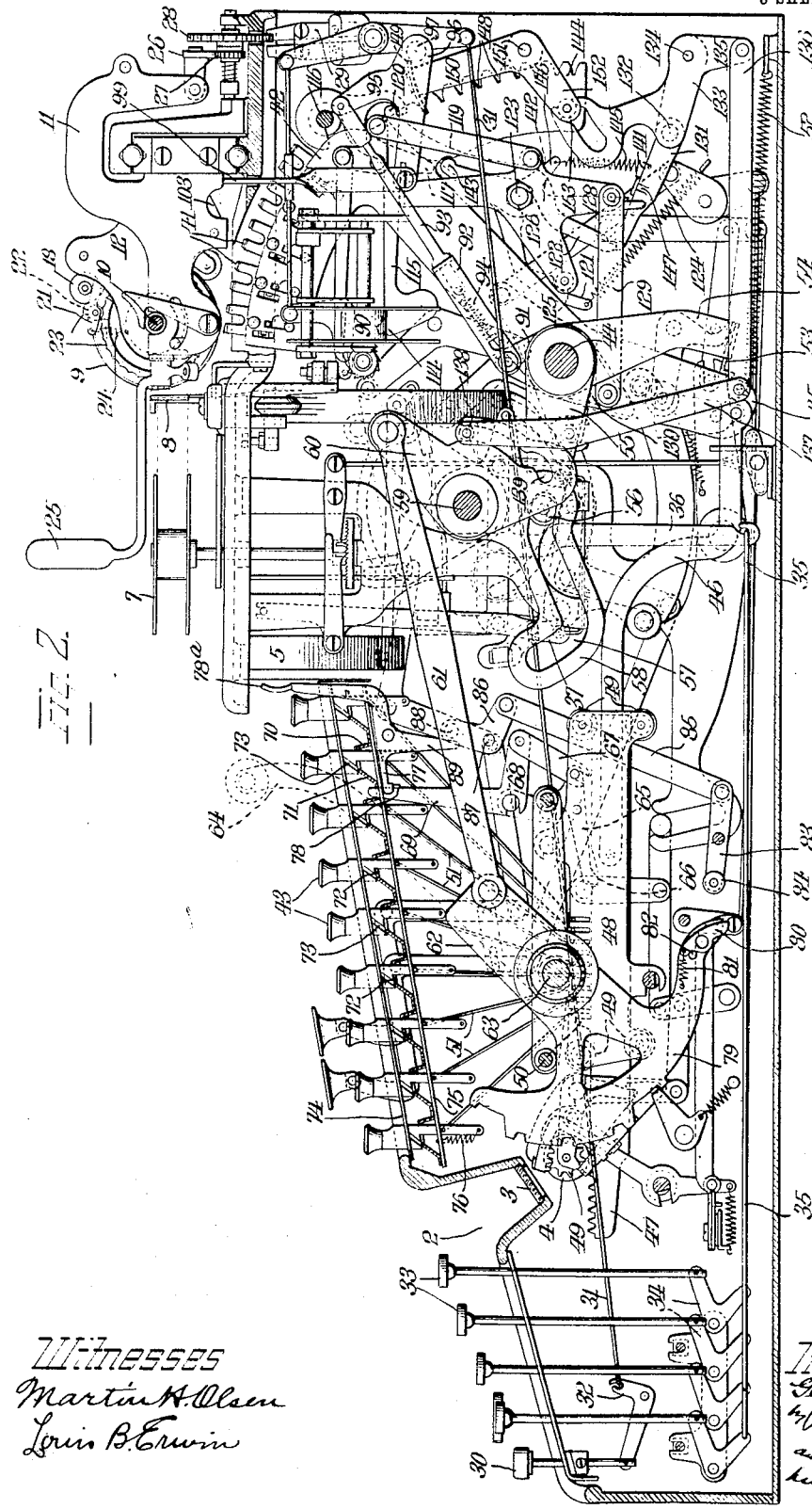

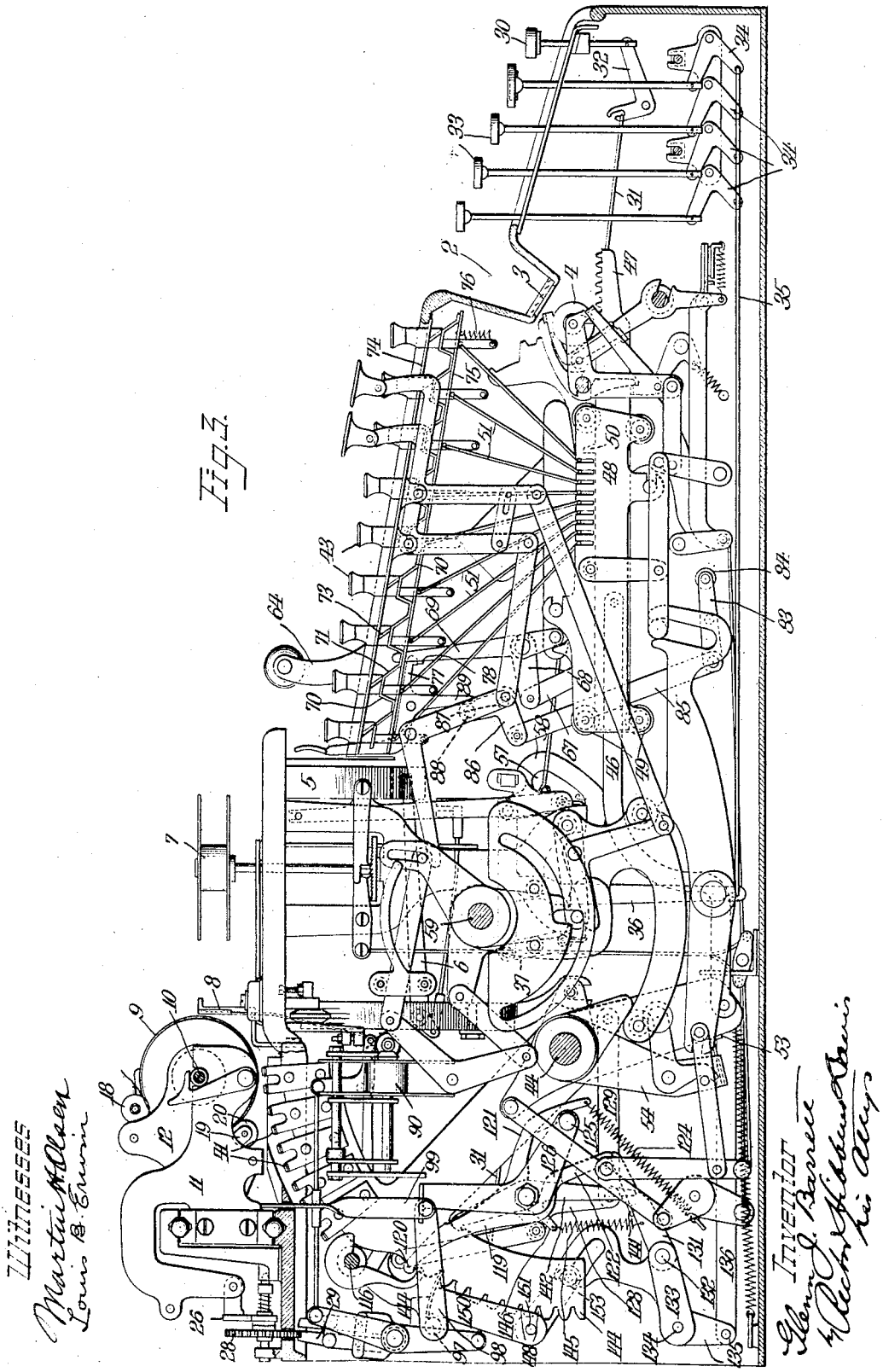

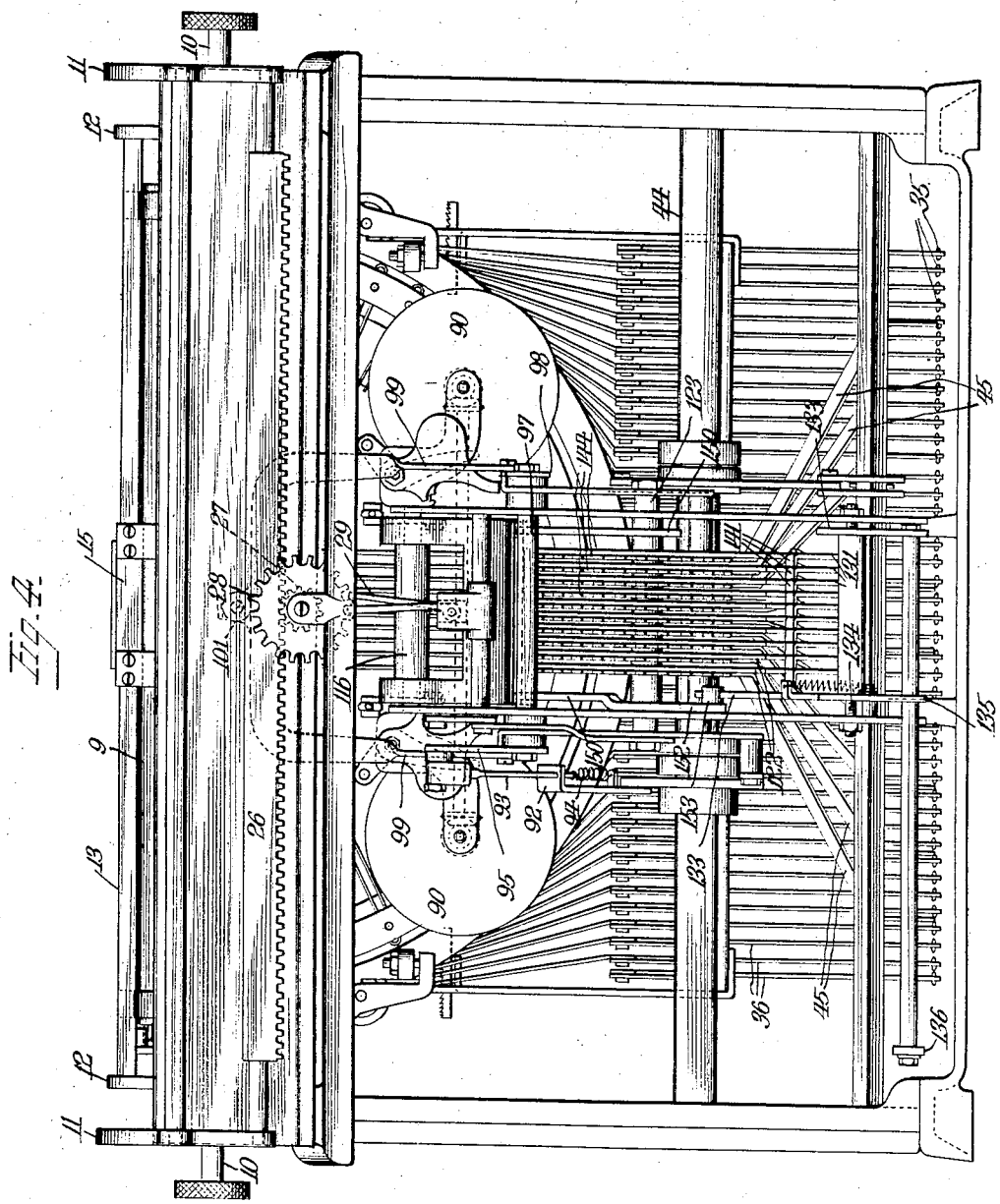

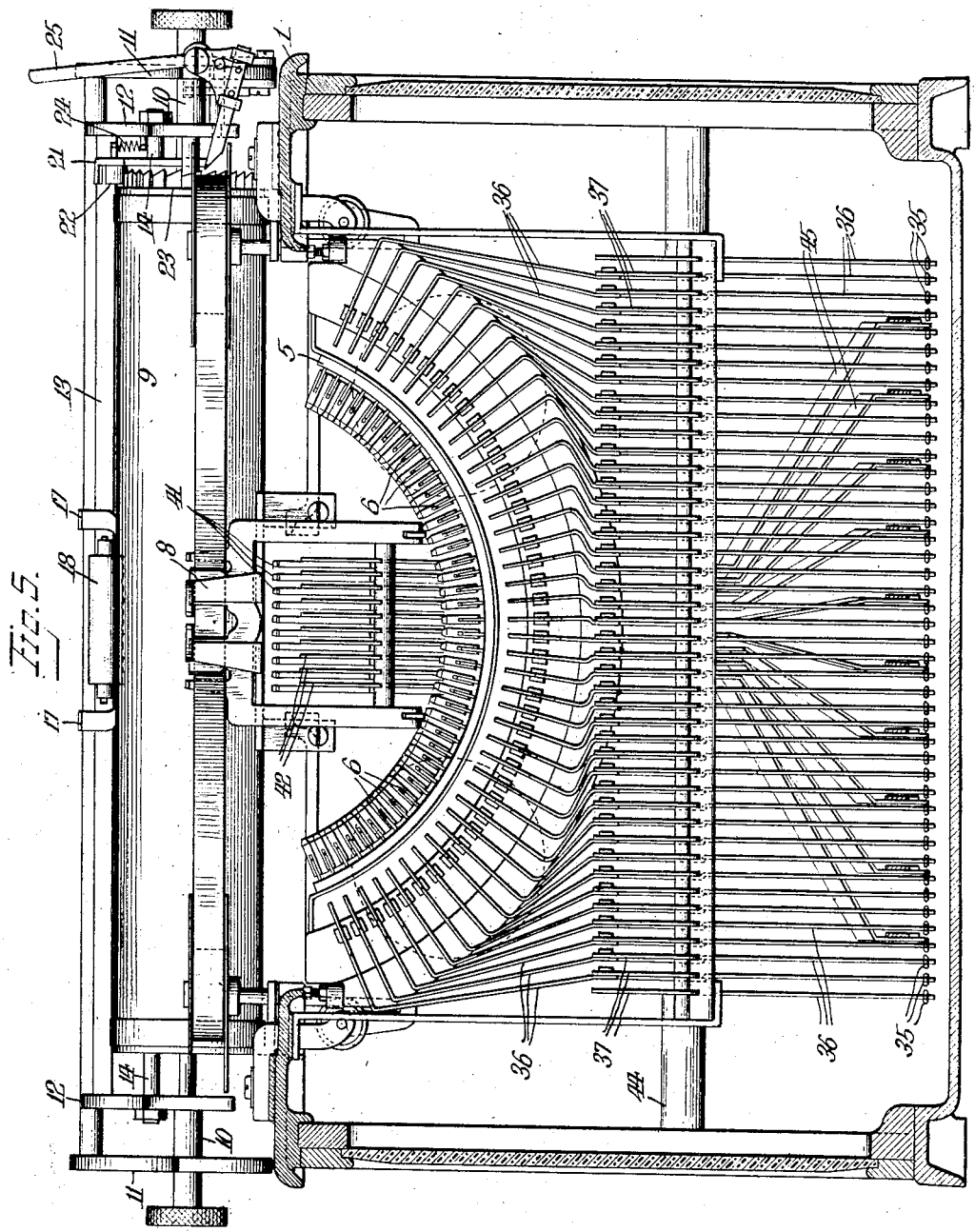

G. J. BARRETT.
COMBINED TYPE WRITING AND AMOUNT LISTING MACHINE.
APPLICATION FILED DEC. 4, 1906.
972,150.
Patented Oct. 11, 1910.
8 SHEETS—SHEET 6.
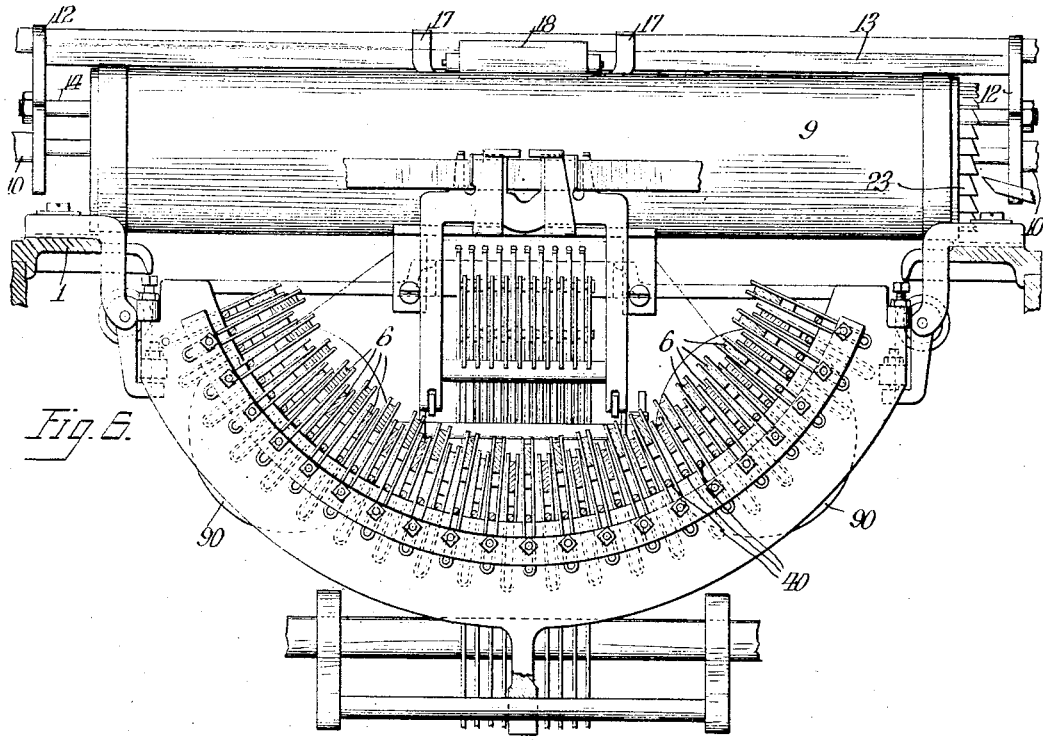
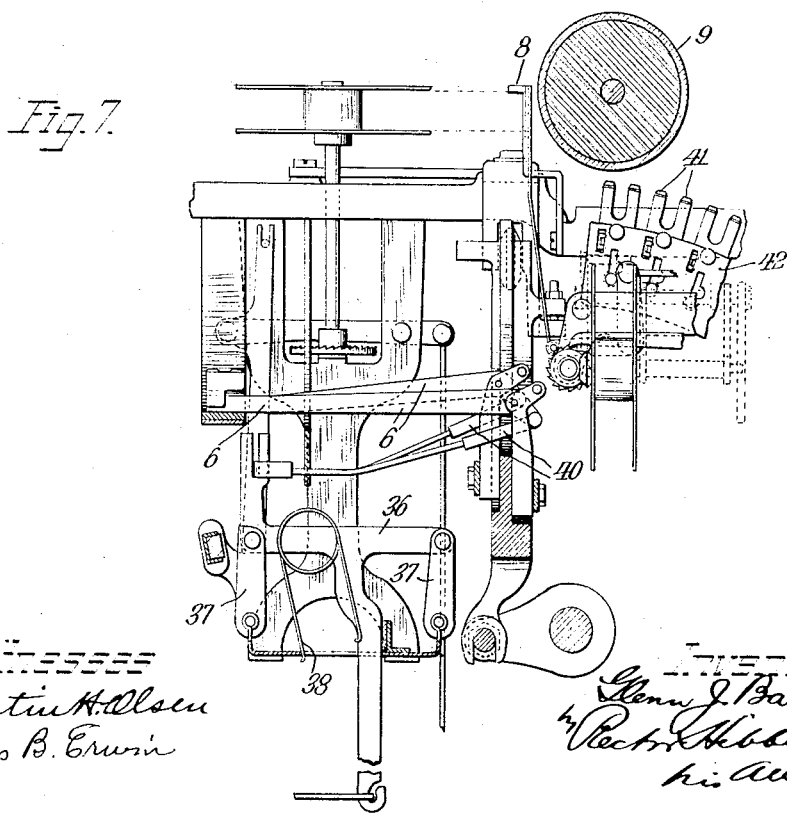

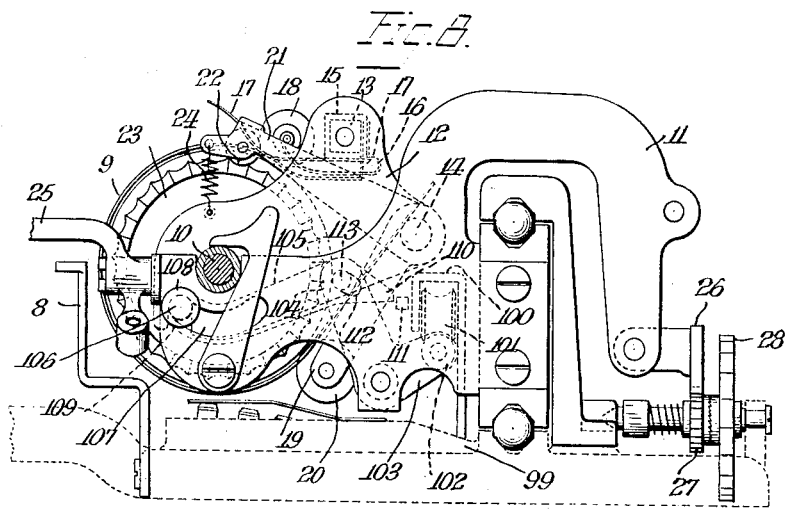

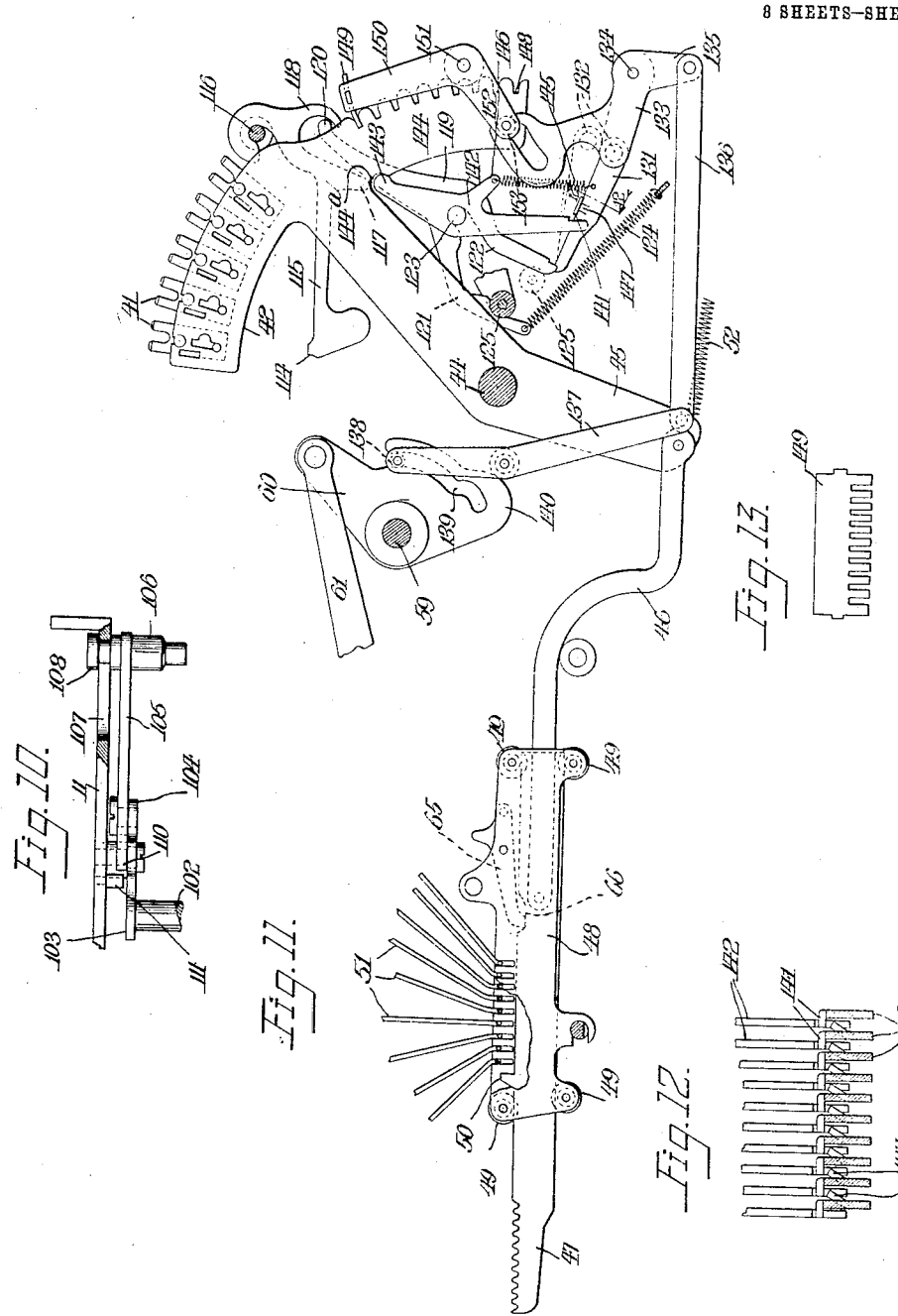

UNITED STATES PATENT OFFICE.

GLENN J. BARRETT, OF SYRACUSE, NEW YORK, ASSIGNOR TO BURROUGHS ADDING MACHINE COMPANY, OF DETROIT, MICHIGAN, A CORPORATION OF MICHIGAN.

COMBINED TYPE-WRITING AND AMOUNT-LISTING MACHINE.

972,150.  Specification of Letters Patent.  Patented Oct. 11, 1910.

Application filed December 4, 1906. Serial No. 346,279.

*To all whom it may concern:*

Be it known that I, GLENN J. BARRETT, residing at Syracuse, Onondaga county, New York, have invented certain new and useful Improvements in Combined Type-Writing and Amount-Listing Machines, of which the following is a specification.

The chief object of the present invention is to provide for visible writing after the manner of the so-called "front strike" type-writing machines while at the same time providing for the printing of an amount on the same horizontal line that the visible writing follows, by causing the paper to face a different way when receiving amount imprints from the way in which it faces when receiving typewriter imprints. Thus, when the familiar typewriter roller platen is employed in an embodiment of the present invention, it will present the paper facing toward the front to receive the type-written imprints, whereas when the listing department of the machine is operated this roller platen will turn so as to present, facing downward, that portion of the paper along which the typewriting has been done; then at the conclusion of the amount printing operation the roller platen will return to its original position again presenting the printed portion of the paper facing toward the front. It will be seen that this arrangement permits of both typewriting and amount printing mechanisms being confined within the lateral limits of an ordinary typewriter or an ordinary adding machine for these mechanisms are not required to be arranged side by side but one can be in the rear of the other and the key-board of one can correspondingly extend in rear of the key-board of the other. For example, the ordinary typewriter key-board can occupy its usual position at the foremost part of the machine while the adding machine key-board can intervene between said typewriter key-board and the type-basket of a "front strike" type-writing mechanism, the type-carriers of the amount printing mechanism being located in rear of said basket and the type-bars thereof. Thus within practically the compass of an ordinary adding machine, a combined type-writer and adding machine may be embraced and the key-board of each played with as much facility as similar key-boards of either the ordinary type-writer or the ordinary adding machine.

With the above stated and incidental objects in view the invention consists in certain novel features of construction and combinations of parts the essential elements whereof are recited in the appended claims and a preferred form of embodiment of which is described in detail hereinafter and fully illustrated in the accompanying drawings forming part of this specification.

Of said drawings Figure 1 represents in plan view a machine embodying the invention; Fig. 2 represents said machine principally in right side elevation, the supporting frame-work and part of the amount key-board appearing in section; Fig. 3 represents said machine in left side elevation with frame-work in section; Fig. 4 represents the machine in rear elevation with the casing panels removed; Fig. 5 represents a vertical cross-section of the machine taken just in front of the typewriter basket, and looking toward the rear but omitting a number of parts whose appearance in cross-section would serve no useful purpose in this view; Fig. 6 is a somewhat similar sectional view thereof taken on a line farther to the rear and not including the lower part of the machine nor carried quite to the sides thereof; Fig. 7 is a fragmentary section from front to rear of the machine taken at about the middle of the same and embracing the typewriter basket and part of the amount printing mechanism; Fig. 8 is a right side elevation of the super-structure of the machine which includes the roller platen and appurtenances; Fig. 9 is a sectionalized left side elevation of the same parts, the roller platen being shown in dotted lines as the section is taken beyond the same; Fig. 10 is a top plan view partly in section of certain of the parts appearing in side elevation in Fig. 9; Fig. 11 represents in side elevation that portion of the machine having to do more especially with the actuation of the amount types; Fig. 12 represents a cross-section taken on the line 12—12 of Fig. 11; and Fig. 13 represents an alining and guiding comb detached in plan view.

Referring first to Fig. 1 the reference numeral 1 designates the skeleton castings of the supporting frame-work and inclosing casing of the machine, the same being formed to provide panels after the usual style in this class of machines. In the present instance provision is made for two key-boards, one at the very front of the machine with keys bearing the usual typewriter inscriptions and another in rear of this typewriter key-board with keys arranged in parallel rows and numbered from one to nine in each row after the manner of the usual adding machine key-board. Both key-boards rise as they extend rearwardly and in the present instance the general plane of the amount key-board is higher than that of the typewriter key-board partly to sufficiently separate the two key-boards to prevent touching the keys of one while operating the other and partly for the purpose of exposing to view at a convenient place the adding or indicating wheels or dials which show the results of operations of the adding or amount printing or listing section or department of the machine. For this latter purpose the castings of the frame-work and casing provide a reentrant portion 2 (Fig. 2) extending across the machine between the two key-boards with a sight opening in the bottom covered by glass 3 immediately over the adding or indicating wheels 4. In rear of the amount key-board the casing and frame-work is elevated to properly support the type-basket 5 which may be of the usual form designed to accommodate the type-bars 6 lying horizontally with their type facing upward. This portion of the frame-work also supports typewriter ink ribbon spools 7, the ink ribbon passing through suitable upright guides 8 whereby it is properly disposed in front of a roller platen 9. The latter carries trunnions 10 resting in suitable bearings in the side pieces 11 of a laterally shifting carriage such as commonly employed in typewriting machines. In the present instance the trunnions of this roller platen also have bearings in the side plates 12 of a cradle which is adapted to rock in the laterally shifting carriage. This cradle is completed by cross-rods 13 and 14 which connect the side plates 12 and support certain well known roller platen appurtenances such as paper guides and feed rollers. The cross-rod 13 is preferably square in cross-section and on it is mounted a sliding block 15 carrying the resilient arms 16 and 17, the latter constituting paper guides and the former supporting a comparatively short feed roller 18. This structure is used when a narrow strip of paper is employed as common in adding machines when simply listing amounts. The cross-rod 14 carries arms 19 which support between them a long feed roller 20 suitably spring-pressed against the platen roller 9 and serving as in the ordinary typewriter to feed a wide sheet of paper. This cross-rod 14 also carries an arm 21 having a roller 22 engaging the corrugated periphery of a ratchet disk 23 on one end of the platen roller 9. A spring 24 connects the outer end of said arm 21 with one of the side plates 12 of the cradle so as to press the roller 22 against the corrugated periphery of the disk 23 with sufficient force to accomplish the usual result of holding the platen roller at the different positions it takes up in the line spacing. In the present instance another function is allotted to this alining device, viz., that of establishing a frictional connection between the platen roller and its cradle whereby the rocking of the latter with the journal of the platen roller as a center will result in turning said roller. In carrying out the principal object hereinbefore mentioned said cradle is rocked to such extent as to move the platen roller through an arc of ninety degrees so that the portion of the roller serving as a platen for the front strike of the typewriter keys will be carried downward and rearward to a substantially horizontal position above the amount printing type-carriers.

The reference numeral 25 designates the usual handle lever pivoted upon the sliding carriage 11 and adapted to serve the double purpose of returning the carriage to the right and turning the platen roller for line spacing through coöperation with the crown ratchet of the disk 23 in a well known manner. The carriage 11 carries the usual rack 26 meshing with a spring-impelled pinion 27 clutched to an escapement wheel 28. The usual escapement pallet 29 is employed to bring about the step by step movement of the carriage toward the left in typewriting, said pallet being operatively connected with a space bar 30 at the front of the typewriter key-board and also with the key-operated type-driving devices. The connection between the escapement pallet and said space bar is accomplished through the medium of a long link 31 and a bell-crank lever 32. The character keys of the typewriter mechanism are designated by the numeral 33 and they are connected through bell-crank levers 34 and links 35 with cross-heads 36 mounted on radius links 37 and held by springs 38 in normal rearward position. The type-bars 39 are connected through links 40 with said cross-heads 36 so that when the keys are struck the type-bars will be swung upwardly through an arc of ninety degrees, striking the ink ribbon from the front in the usual manner to make an imprint upon the paper where it lies over the front of the platen roller. Suitable mechanism will be employed to shift the ink ribbon as a result of striking the typewriter keys and to reverse the direction of movement of the ribbon when it has been unwound from one spool 7 but these devices form no part of the present invention nor is a description of them at all necessary to a complete understanding of the present invention. Consequently no detailed description of such devices will be given herein. Enough has been pointed out with reference to the typewriting section or department of the machine to show that it will operate as any ordinary typewriter.

The type for printing amounts is in the form of short bars 41 slidingly mounted in sets of five upon sector plates 42, there being one of these sets of type-bars for each row or bank of amount keys 43. Reference may be had to the patent to William S. Burroughs No. 505,078 for the details of this character of type-carriers. The sector plates 42 are mounted to swing upon a cross-shaft 44 and each is formed with a depending arm 45 connected by a bent link 46 with a rack 47 mounted to slide between guide plates 48 carrying antifriction rollers 49 in engagement with the edges of the racks. Each rack has an upstanding projection 50 and the amount keys 43 are connected with rods or wires 51 having laterally bent lower ends occupying vertical slots in the guide plates 48 and adapted to present stops to the projections 51 for limiting the movements of the racks 47 according to the denomination of the key depressed. The sector plates 42 stand normally in rearward position with zero types at the printing line. It will be seen that rearward movement of the racks 47 through the connections described will permit forward swinging of the sector plates and consequently the advance of numeral types to the printing line. Springs 52 coupled to the arms 45 and the base of the machine tend to draw said arms rearwardly and consequently swing the sectors forwardly. Such movement of the sectors is, however, normally prevented by the engagement with the rear edges of the arms 45 of a cross-bar 53 carried by arms 54 secured to the shaft 44. This cross-bar and its supporting arms constitute a restoring frame for bringing the type-sectors back to normal position at the conclusion of an operation whereas at the outset of an operation this frame will be swung rearwardly so as to permit advance of any of the type-sectors.

An arm 55 secured to the shaft 44 extends forwardly and carries a roller 56 in engagement with a cam-slot 57 of a plate 58 secured to a shaft 59. The latter has secured to it another plate 60 connected through a link 61 with a crank arm 62 secured to a rock-shaft 63 to which an operating crank handle 64 (see dotted lines, Fig. 2) is attached. The form of the cam-slot 57 is such that upon drawing forward the operating handle 64 the frame composed of the arms 57 and the cross-bar 53 will be swung rearwardly. This removes the obstruction to rearward movement of the type-sector arms 45 and in those banks where amount keys have been depressed the type-sectors advance until the projections 50 of the racks 47 encounter the bent ends of the stop rods or wires 51. Of course in banks where no keys have been depressed there should be no such advance of the type-sectors. To prevent movement thereof notwithstanding the retreat of the restoring frame, a series of latches 65 are employed, the same being pivoted intermediate their ends to the plates 48 and normally engaging at their forward ends in notches 66 of the racks 47. It will be seen that engagement of the abrupt forward ends of these notches with the front ends of the latches will prevent rearward movement of the racks so long as the latches remain in their normal position. Preponderance of weight on the front side of the pivots of these latches will suffice to engage them with the notches but springs may be employed for this purpose if desired. In rear of their pivots the latches are engaged by slotted ends of links 67, respectively, these links being in turn coupled to the short arms 68 of bell-crank levers whose longer arms 69 protrude through slots in detent plates 70 for the several banks of keys. Each of these detent plates is formed with a series of inclined portions 71, one for each key, and with slotted horizontal portions 72 through which the keys extend. Each key-stem has an inclined slot 73 normally in alinement with the associated inclined portion 71 of the detent plate. It will be seen that depression of any key will therefore result in sliding the detent plate rearwardly. This in turn swings the long arm 69 of the aforesaid bell-crank rearwardly and its short arm downwardly thereby depressing the rear end of the latch 65 and disengaging its front end from the notch of the rack 47. The stems of the keys are under-cut where the inclined slots are formed and the undercut is carried beyond the slots so that when the detent plate is moved rearwardly by the depression of any one of the keys all the other keys are locked against depression by reason of the inclined portions 71 of the detent plate passing rearwardly beyond the slots of these unoperated keys. The key-stems work through slots in horizontal plates 74 and 75 and are normally upheld by springs 76 connecting the lower ends of the key-stems with the plate 75. The detent plate is caught and held in its displaced position by a latch 77 pivoted below said plate 75 and formed at its forward end to drop over a lip 78 of the bell-crank arm 69 shortly after the latter has started rearward. This latch 77 is extended in rear of its pivot and provided with a handle 78 projecting up through slots in the plates 74 and 75 so that a depressed key may be released for correction of an error. Otherwise the release of depressed keys takes place as a result of a forward and backward movement of the operating handle 64. This machine release is effected near the close of the backward movement of the handle as follows: The crank arm 62 has a segmental extension 79 on the opposite side of the shaft 63 and at the lower end of this extension a flip pawl 80 held by a spring 81 against a stop-pin 82. A lever 83 pivoted intermediate its ends to the supporting frame-work of the machine carries a roller 84 at its forward end over which roller said flip pawl 80 rides when the operating handle is drawn forward. When the operating handle moves backward to normal position the flip pawl 80, prevented from turning by the stop-pin 82, acts against the roller 84 and rocks the lever 83. This lever on the rear side of its pivot is coupled to a link 85 which is in turn coupled to a bell-crank lever 86. The latter is secured to a pivot rod 87 which extends across the machine and carries another arm similar to the upstanding portion of the bell-crank lever 86 between which and said arm extends a rod 88. Each of the latches 77 is formed with a depending finger 89 overlying the front side of said rod 88. It will therefore be seen that when the lever 83 is rocked in the manner described the rod 88 will lift all of the latches 77 and thus permit the detent plates 70 to be restored to normal position as the depressed keys rise under the influence of their springs. Of course the detent plates themselves may be drawn forward by springs if desired.

From the above description it will be clearly understood how the type-carriers take up positions to present at the printing line type corresponding with the keys which have been depressed, zero types being of course presented in banks where no keys have been operated. An inking ribbon extends between the type at the printing line and the platen roller 9, this inking ribbon being carried by spools 90 and shifted step by step in the operations of the machine through devices which need not be described in detail in this specification. In furtherance of the design of turning the platen roller through an arc of ninety degrees when amount printing is to be done the following connections are employed. There is secured to the rock-shaft 44 a short arm 91 to which is jointed one end of a link preferably composed of two telescoping members 92 and 93 held together by a spring 94. The other end of this link is coupled to an upstanding projection 95 of one side bar 96 of a frame including a rock rod 97 extending across the machine and another side arm 98 at the opposite side of the machine (Fig. 3). To the forward ends of the side-bars 96 and 98 of this frame are joined the lower ends of a yoke 99 which extends up into the laterally shifting typewriter carriage 11 and is formed therein as a hanger (see dotted lines at 100, Fig. 8) supporting a roller 101 riding upon the cross-rod 102 of a rocking frame completed by side-bars 103 pivoted on studs of the carriage 11. One of these side-bars has a projecting arm 104 giving it a bell-crank form and this arm 104 is joined to a pitman 105 which at its forward end carries a pin 106 extending through an arc-shaped slot 107 in the side plate of the carriage, being headed over said slot as shown at 108 in Fig. 10. Said pin on the opposite side of the pitman 105 enters a notch 109 in the under-edge of one of the side plates of the platen cradle.

It will be seen that through the connections described the forward rocking of the shaft 44 produced by forward movement of the operating handle 64 results in drawing down the frame composed of the side arms 96 and 98 and cross-rod 97 so that the yoke 99 is lowered and in consequence the frame 102—103 swung downwardly and the arm 104 rocked rearwardly drawing the pitman 105 with it and thus turning the cradle and the platen to the desired extent. In this manner that portion of the paper overlying the platen roller, which portion was presented to the typewriter action, will be carried down and rearwardly and brought to the proper position for receiving an imprint from the amount types. In order to prevent rocking of the cradle by the turning of the platen roller in the customary typewriter adjustments, the pitman 105 is formed with a rearward extension 110 which normally extends in front of a square lug 111 on the inner side of one of the carriage side plates as shown in Fig. 9. Where the pitman is coupled to the crank arm 104 it is formed with an oblique slot 112 the sides of which have a cam action in conjunction with the pin 113 of said crank arm so that when the latter swings rearwardly the extension 110 of the pitman will be lifted above the stop-pin 111. Thus only through the medium of the crank arm 65 can the cradle be rocked.

The devices for causing the amount types to impinge against the ink ribbon and thereby make an imprint upon the paper in line with the typewritten matter, will next be described. This appears more clearly in Figs. 2, 3, 11 and 12. The type positioned at the printing line are projected toward the platen after the manner of the well known Burroughs adding machine and as disclosed in said Burroughs patent, there being a separate hammer for each set of type and these hammers being normally retracted against spring pressure. The means for tripping the hammers are dependent for operativeness upon displacement of the type-sectors so that only when an amount key has been depressed in a bank will the tripping devices belonging to that bank be rendered operative, means being provided however for causing the automatic tripping of hammers belonging to unoperated banks to the right of the bank of highest denomination where a key has been operated, in order to provide for the necessary filling in of ciphers. In the present case the hammers 114 are formed on the forward ends of levers 115 which at their rear ends are hung upon a pivot rod 116 at the back of the machine. Each of these hammer levers is formed with a depending prong 117 and with a curved horn 118 in rear of said prong whereby the hammer lever is given a bifurcated form below its pivot straight along one side which forms the rear edge of the prong 117 and curved in a semicircle at the other side which forms the inner edge of the horn 118. A hammer driver coöperates with each hammer lever and comprises an upward extending curved arm 119 with a rounded end portion 120 bearing against the semicircular edge of the hammer lever bifurcation. The front edge of this arm 119 is curved for contact with the rear side of the prong 117 and in operation has a rocking engagement therewith so that the first movement of the hammer toward the type will be at considerably less speed than its final movement which imparts the printing blow to the type. The hammer driver is formed with legs 121 and 122 which straddle a pivot rod 123. Springs 124 fastened to the lower extremities of the legs 121 and to the fixed frame-work of the machine tend to draw said legs rearwardly and consequently throw the arms 119 forward to actuate the hammers. Normally a cross-rod 125 engaging with shoulders of the legs 121 holds the latter forward against the action of said springs. This cross-rod forms part of a restoring frame for the hammer drivers, said frame comprising side arms 126 pivoted upon a cross-rod or shaft 127, one of said side arms having a depending part 128 connected by a link 129 with a short crank arm 130 fastened to the shaft 44. When the operating handle 64 is drawn forward and the shaft 44 consequently rocked this crank arm 130 moves rearwardly and in consequence the restoring frame is swung rearwardly so that the legs 121 of the hammer drivers are released from the restraining influence of said frame. However, the hind legs 122 of said hammer drivers normally abut at their lower ends against shoulders of triggers 131 so that the retreat of the restoring frame alone will not permit the hammer drivers to act.

The triggers 131 are in the form of fingers pivoted on a cross-rod 132 carried between side plates 133 pivoted at 134 to the frame of the machine. One of these side plates has a depending arm 135 connected by a link 136 with the lower arm of a lever 137 pivoted intermediate its ends to the frame of the machine and carrying at the upper end of its upper arm a roller 138 occupying a cam slot 139 in a depending portion 140 of the plate 60 heretofore described. The cam slot is of such contour that toward the end of the forward movement of the operating handle 64 after the rearward swing of the rack restoring frame 53—54 is over, the lever 137 will be vibrated so as to elevate the trigger-carrying frame 132—133 thus carrying the trigger supporting rod 132 to the dotted line position shown in Fig. 11. This of course results in elevating the rear ends of the triggers but does not result in freeing the hind legs 122 of the hammer drivers, the shouldered ends of the triggers simply rocking on the heels of these legs as illustrated in dotted lines in Fig. 11. In order to disengage the triggers from said heels it is proposed to establish fulcrums for the triggers intermediate their ends under control of the type-carriers. To this end each trigger is formed with a laterally projecting lip or flange 141 and there is mounted to swing upon the hammer driver pivot rod 123 a set of catches 142 in the form of levers with depending arms shouldered for engagement with said laterally projecting lips or flanges 141. The upper arms of these levers are rounded as shown at 143 normally occupying similar shaped notches $144^a$ in the under edges of rearward extensions 144 of the type-sectors. Spiral springs 145 connecting the triggers 131 with rearwardly projecting prongs 146 of the catch levers operate to press the triggers upwardly into engagement with the hammer drivers and to hold the lower arms of the catch levers away from the laterally projecting lips 141 of the triggers. When a type-sector is swung forward by reason of an operation of the machine after a key has been depressed in the bank to which that type-sector belongs, the camming action of the curved edge of the notch $144^a$ against the rounding head 143 of the catch lever has the effect of swinging the lower arm of said lever rearwardly until its shoulder is positioned over the front edge of the laterally projecting lip 141 of the associated trigger 131. Under these conditions the rocking of the frame 132—133 causes the trigger to rock upon the shoulder of the catch arm as a fulcrum so that instead of the trigger rising to the dotted line position shown in Fig. 11 its front end will be depressed as its rear end is elevated and will thus become disengaged from the hind leg of the hammer driver whereupon the latter will act under the influence of its spring 124 to drive the hammer against the type.

In order to provide for displacing triggers to the right of the highest denominational bank used for setting up an amount, notwithstanding no keys may have been depressed in banks belonging to those triggers to the right, the material of the triggers is struck up beneath the lips or flanges 141 so as to form tangs 147 as shown in Fig. 12 projecting on the opposite sides of the triggers to those sides from which the said lips project. Thus the tang of one trigger lies beneath the laterally projecting lip of the neighboring trigger. If therefore no key has been depressed in a bank to the right of one in which a key has been depressed, so that in this unoperated bank to the right the catch lever 142 remains in its ineffective position, nevertheless the trigger will be rocked on the middle fulcrum and the hammer driver released because of the laterally projecting lip of the next trigger to the left overlying the tang 147 of the unoperated bank whereby this trigger is likewise held from upward movement at its middle and compelled to rock about a central fulcrum. In this manner the necessary ciphers will be printed in the decimal spaces to the right of the highest denominational digit where the amount is not made up entirely of digital numbers.

In order to insure alinement of the amount types the rearward extensions 144 of the type-sectors have their rear edges scalloped as shown at 148 forming notches spaced apart the distance that the type are spaced apart. A comb 149 is arranged with its tines extending between the type-sector extensions 144 so as to properly guide the same and this comb is carried upon a pair of arms 150 pivoted on a cross-rod 151, one of said side arms having a downward and forward extension 152 with a roller 153 occupying a cam slot 154 in an upward extension of one of the side plates 133 of the trigger carrying frame. It will be remembered that the said frame is not moved until after the type have been positioned. Its movement then produces a forward rocking of the comb frame whereby those portions of the comb at the bases of the tines thereof are caused to enter the notches 148 which correspond with the particular type in position to print. In this manner the alinement of the type is insured.

As to indicating and registering or adding mechanism it will be sufficient to state that the wheels 4 carry pinions 4ª adapted to coöperate with the racks 47. If indicating merely is desired the pinions will remain constantly in mesh with the racks. If accumulating is to be accomplished then the pinions will be moved into and out of mesh with the racks and suitable means will be employed to regulate the periods of engagement and disengagement so that either accumulating, subtotal printing or grand total printing can be accomplished after the manner of the well known Burroughs adding machine. It is not proposed to enter into the details of mechanism which may be employed to accomplish these results because the present invention does not have necessary correlation with accumulating or total printing instrumentalities.

It is of course to be understood that the invention is not limited to the particular form of embodiment here chosen for purposes of illustration and detailed description and that while certain well known typewriter and adding machine arrangements have been selected for the purpose of fully disclosing a complete organization whereby the invention can be practiced, yet there are many other types of typewriter and adding machine arrangements which could equally well be utilized in carrying out said invention. Therefore in the claims which follow the essential elements of the invention are recited without limitation to details of construction.

What is claimed is:

1. The combination with front-strike typewriting means and amount-printing means striking in a different direction, of paper-supporting means shiftable to first present the paper to be typewritten along a line facing the operator and visible to him and then to present the paper to the amount-printed along the same line shifted to face differently.

2. The combination with front-strike typewriting means and amount-printing means striking in a different direction, of paper-supporting platen shiftable to first present the paper to be typewritten along a line facing the operator and visible to him and then to present the paper to be amount-printed along the same line shifted to face differently.

3. The combination with front-strike typewriting means and amount printing means striking in a different direction, of a laterally shifting paper-carriage, and paper-supporting means shiftable therein to first present the paper to be type-written along a line facing the operator and visible to him and then to present the paper to be amount printed along the same line shifted to face differently.

4. The combination with front-strike typewriting means and amount printing means striking in a different direction, of a laterally shifting paper-carriage, and paper-supporting platen shiftable therein to first present the paper to be typewritten along a line facing the operator and visible to him and then to present the paper to be amount printed along the same line shifted to face differently 5. The combination with typewriting means striking in one direction and amount printing means striking in a different direction, of paper-supporting and feeding means movable in the line of paper feed to first present the paper to be typewritten along a certain line and then to present the paper to be amount-printed along the same line.

6. The combination with front-strike typewriting means and amount-printing means striking in a different direction, of paper-supporting means rotatable to first present the paper to be typewritten along a line facing the operator and visible to him and then to present the paper to be amount-printed along the same line shifted to face differently.

7. The combination with typewriting means striking in one direction and amount printing means striking in a different direction, of paper-supporting platen and feeding means movable in the line of feed to first present the paper to be typewritten along a certain line and then to present the paper to be amount-printed along the same line.

8. The combination with front-strike typewriting means and amount-printing means striking in a different direction, of paper-supporting platen rotatable to first present the paper to be typewritten along a line facing the operator and visible to him and then to present the paper to be amount-printed along the same line shifted to face differently.

9. The combination with typewriting means striking in one direction and amount printing means striking in a different direction, of a laterally shifting paper-carriage, and paper-supporting and feeding means movable in the line of paper feed therein to first present the paper to be typewritten along a certain line and then to present the paper to be amount-printed along the same line shifted to face differently.

10. The combination with front-strike typewriting means and amount-printing means striking in a different direction, of a laterally shifting paper-carriage, and paper-supporting means rotatable therein to first present the paper to be typewritten along a line facing the operator and visible to him and then to present the paper to be amount printed along the same line shifted to face differently.

11. The combination with typewriting means striking in one direction and amount-printing means striking in a different direction, of a laterally shifting paper-carriage, and paper-supporting platen and feed devices therein movable in the feed line to first present the paper to be typewritten along a certain line and then to present the paper to be amount-printed along the same line.

12. The combination with front-strike typewriting means and amount printing means striking in a different direction, of a laterally shifting paper-carriage, and paper-supporting platen rotatable therein to first present the paper to be typewritten along a line facing the operator and visible to him and then to present the paper to be amount printed along the same line shifted to face differently.

13. The combination with front-strike typewriting means and amount-printing means striking in a different direction, of paper-supporting roller platen shiftable to first present the paper to be typewritten along a line facing the operator and visible to him and then to present the paper to be amount-printed along the same line shifted to face differently.

14. The combination with front-strike typewriting means and amount-printing means striking in a different direction, of a laterally shifting paper-carriage, and a paper-supporting roller platen shiftable therein to first present the paper to be typewritten along a line facing the operator and visible to him and then to present the paper to be amount printed along the same line shifted to face differently.

15. The combination with typewriting means striking in one direction and amount printing means striking in a different direction, of a paper-supporting roller platen shiftable on its own axis to first present the paper to be typewritten along a certain line and then to present the paper to be amount-printed along the same line.

16. The combination with front-strike typewriting means and amount-printing means striking in a different direction, of a paper-supporting roller platen shiftable on its own axis to first present the paper to be typewritten along a certain line and then to present the paper to be amount-printed along the same line.

17. The combination with typewriting means striking in one direction and amount printing means striking in a different direction, of a laterally shifting paper-carriage, and a paper-supporting roller platen shiftable on its own axis therein to first present the paper to be typewritten along a certain line and then to present the paper to be amount-printed along the same line.

18. The combination with front-strike typewriting means and amount-printing means striking in a different direction, of a laterally shifting paper-carriage, and a paper-supporting roller platen shiftable on its own axis therein to first present the paper to be typewritten along a certain line and then to present the paper to be amount printed along the same line.

19. The combination with typewriting means striking in one direction and amount printing means striking in a different direction, of a roller platen, and a cradle therefor shiftable about the axis of the roller platen to first present the paper to be typewritten along a certain line and then to present the paper to be amount-printed along the same line.

20. The combination with front-strike typewriting means and amount printing means striking in a different direction, of a roller platen, and a cradle therefor shiftable to first present the paper to be typewritten along a line facing the operator and visible to him and then to present the paper to be amount-printed along the same line shifted to face differently.

21. The combination with typewriting means striking in one direction and amount printing means striking in a different direction, of a laterally shifting paper carriage, a roller platen therein, and a cradle for said platen shiftable about the axis of the roller platen to first present the paper to be typewritten along a certain line and then to present the paper to be amount-printed along the same line.

22. The combination with front-strike typewriting means and amount printing means striking in a different direction, of a laterally shifting paper carriage, a roller platen therein, and a cradle for said platen shiftable to first present the paper to be typewritten along a line facing the operator and visible to him and then to present the paper to be amount-printed along the same line shifted to face differently.

23. The combination with typewriting means striking in one direction, and amount printing means striking in a different direction, of a roller platen, and a cradle therefor mounted concentrically therewith and shiftable to first present the paper to be typewritten along a certain line and then to present the paper to be amount-printed along the same line.

24. The combination with typewriting means striking in one direction and amount printing means striking in a different direction, of a laterally shifting paper carriage, a roller platen therein, and a cradle for said platen mounted concentrically therewith and shiftable to first present the paper to be typewritten along a certain line and then to present the paper to be amount-printed along the same line.

25. The combination with typewriting means striking in one direction, and amount printing means striking in a different direction, of a roller platen, and a cradle therefor mounted concentrically and having frictional engagement therewith and shiftable to first present the paper to be typewritten along a certain line and then to present the paper to be amount-printed along the same line.

26. The combination with typewriting means striking in one direction and amount printing means striking in a different direction, of a laterally shifting paper carriage, a roller platen therein, and a cradle for said platen mounted concentrically and having frictional engagement therewith and shiftable to first present the paper to be typewritten along a certain line and then to present the paper to be amount-printed along the same line.

27. The combination with typewriting means striking in one direction and amount printing means striking in a different direction, of paper-supporting means shiftable to first present the paper to be typewritten along a certain line and then to present the paper to be amount-printed along the same line and means for so shifting the paper-supporting means as an accompaniment to an operation of the amount-printing devices.

28. The combination with front-strike typewriting means and amount-printing means striking in a different direction, of paper-supporting means shiftable to first present the paper to be typewritten along a certain line and then to present the paper to be amount-printed along the same line and means for so shifting the paper-supporting means as an accompaniment to an operation of the amount-printing devices.

29. The combination with typewriting means striking in one direction and amount printing means striking in a different direction, of paper-supporting platen shiftable to first present the paper to be typewritten along a certain line and then to present the paper to be amount-printed along the same line and means for so shifting the paper-supporting platen as an accompaniment to an operation of the amount-printing device.

30. The combination with front-strike typewriting means and amount-printing means striking in a different direction, of a paper-supporting platen shiftable to first present the paper to be typewritten along a certain line and then to present the paper to be amount-printed along the same line and means for so shifting the paper-supporting platen as an accompaniment to an operation of the amount-printing devices.

31. The combination with typewriting means striking in one direction and amount-printing means striking in a different direction, of a laterally shifting paper-carriage, and paper supporting means shiftable therein to first present the paper to be typewritten along a certain line and then to present the paper to be amount-printed along the same line and means for so shifting the paper-supporting means as an accompaniment to an operation of the amount-printing devices.

32. The combination with front-strike typewriting means and amount-printing means striking in a different direction, of a laterally shifting paper-carriage, and paper-supporting means shiftable therein to first present the paper to be typewritten along a certain line and then to present the paper to be amount printed along the same line and means for so shifting the paper-supporting means as an accompaniment to an operation of the amount-printing devices.

33. The combination with typewriting means striking in one direction and amount printing means striking in a different direction, of a laterally shifting paper-carriage, and a paper-supporting platen shiftable therein to first present the paper to be typewritten along a certain line and then to present the paper to be amount-printed along the same line and means for so shifting the paper-supporting platen as an accompaniment to an operation of the amount-printing devices.

34. The combination with front-strike typewriting means and amount-printing means striking in a different direction, of a laterally shifting paper-carriage, and paper-supporting platen shiftable therein to first present the paper to be typewritten along a certain line and then to present the paper to be amount printed along the same line and means for so shifting the paper-supporting platen as an accompaniment to an operation of the amount-printing devices.

35. The combination with typewriting means striking in one direction and amount printing means striking in a different direction, of paper-supporting means rotatable to first present the paper to be typewritten along a certain line and then to present the paper to be amount-printed along the same line and means for so rotating the paper-supporting means as an accompaniment to an operation of the amount-printing devices.

36. The combination with front-strike typewriting means and amount-printing means striking in a different direction, of paper-supporting means rotatable to first present the paper to be typewritten along a certain line and then to present the paper to be amount-printed along the same line and means for so rotating the paper-supporting means as an accompaniment to an operation of the amount-printing devices.

37. The combination with typewriting means striking in one direction and amount-printing means striking in a different direction, of a paper-supporting platen rotatable to first present the paper to be typewritten along a certain line and then to present the paper to be amount-printed along the same line and means for so rotating the paper-supporting platen as an accompaniment to an operation of the amount-printing devices.

38. The combination with front-strike typewriting means and amount-printing means striking in a different direction, of a paper-supporting platen rotatable to first present the paper to be typewritten along a certain line and then to present the paper to be amount-printed along the same line and means for so rotating the paper-supporting platen as an accompaniment to an operation of the amount-printing devices.

39. The combination with typewriting means striking in one direction and amount-printing means striking in a different direction, of a laterally shifting paper-carriage, and paper-supporting means rotatable therein to first present the paper to be typewritten along a certain line and then to present the paper to be amount-printed along the same line and means for so rotating the paper-supporting means as an accompaniment to an operation of the amount-printing devices.

40. The combination with front-strike typewriting means and amount-printing means striking in a different direction, of a laterally shifting paper-carriage, and paper-supporting means rotatable therein to first present the paper to be typewritten along a certain line and then to present the paper to be amount printed along the same line and means for so rotating the paper-supporting means as an accompaniment to an operation of the amount-printing devices.

41. The combination with typewriting means striking in one direction and amount-printing means striking in a different direction, of a laterally shifting paper-carriage, and paper-supporting platen rotatable therein to first present the paper to be typewritten along a certain line and then to present the paper to be amount-printed along the same line and means for so rotating the paper-supporting platen as an accompaniment to an operation of the amount-printing devices.

42. The combination with front-strike typewriting means and amount-printing means striking in a different direction, of a laterally shifting paper-carriage, and a paper-supporting platen rotatable therein to first present the paper to be typewritten along a certain line and then to present the paper to be amount printed along the same line and means for so rotating the paper-supporting platen as an accompaniment to an operation of the amount-printing devices.

43. The combination with typewriting means striking in one direction and amount-printing means striking in a different direction, of a paper-supporting roller platen shiftable to first present the paper to be typewritten along a certain line and then to present the paper to be amount-printed along the same line and means for so shifting the roller platen as an accompaniment to an operation of the amount-printing devices.

44. The combination with front-strike typewriting means and amount-printing means striking in a different direction, of a paper-supporting roller platen shiftable to first present the paper to be typewritten along a certain line and then to present the paper to be amount-printed along the same line and means for so shifting the roller platen as an accompaniment to an operation of the amount-printing devices.

45. The combination with typewriting means striking in one direction and amount-printing means striking in a different direction, of a laterally shifting paper-carriage, and a paper-supporting roller platen shiftable therein to first present the paper to be typewritten along a certain line and then to present the paper to be amount-printed along the same line and means for so shifting the roller platen as an accompaniment to an operation of the amount-printing devices.

46. The combination with front-strike typewriting means and amount-printing means striking in a different direction, of a laterally shifting paper-carriage, and a paper-supporting roller platen shiftable therein to first present the paper to be typewritten along a certain line and then to present the paper to be amount-printed along the same line and means for so shifting the roller platen as an accompaniment to an operation of the amount-printing devices.

47. The combination with typewriting means striking in one direction and amount-printing means striking in a different direction, of a paper-supporting platen shiftable on its own axis to first present the paper to be typewritten along a certain line and then to present the paper to be amount-printed along the same line and means for so shifting the roller platen as an accompaniment to an operation of the amount-printing devices.

48. The combination with front-strike typewriting means and amount-printing means striking in a different direction, of a paper-supporting roller platen shiftable on its own axis to first present the paper to be typewritten along a certain line and then to present the paper to be amount-printed along the same line and means for so shifting the roller platen as an accompaniment to an operation of the amount-printing devices.

49. The combination with typewriting means striking in one direction and amount-printing means striking in a different direction, of a laterally shifting paper-carriage, and a paper-supporting roller platen shiftable on its own axis therein to first present the paper to be typewritten along a certain line and then to present the paper to be amount-printed along the same line and means for so shifting the roller platen as an accompaniment to an operation of the amount-printing devices.

50. The combination with front-strike typewriting means and amount-printing means striking in a different direction, of a laterally shifting paper-carriage, and a paper-supporting roller platen shiftable on its own axis therein to first present the paper to be typewritten along a certain line and then to present the paper to be amount-printed along the same line and means for so shifting the roller platen as an accompaniment to an operation of the amount-printing devices.

51. The combination with typewriting means striking in one direction and amount-printing means striking in a different direction, of a roller platen, and a cradle therefor shiftable to first present the paper to be typewritten along a certain line and then to present the paper to be amount-printed along the same line and means for so shifting the cradle as an accompaniment to an operation of the amount-printing devices.

52. The combination with front-strike typewriting means and amount-printing means striking in a different direction, of a roller platen, and a cradle therefor shiftable to first present the paper to be typewritten along a certain line and then to present the paper to be amount-printed along the same line and means for so shifting the cradle as an accompaniment to an operation of the amount-printing devices.

53. The combination with typewriting means striking in one direction and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices.

54. The combination with front-strike typewriting means and amount printing means striking in a different direction, of a laterally shifting paper carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices.

55. The combination with typewriting means striking in one direction, and amount printing means striking in a different direction, of a roller platen, and a cradle therefor mounted concentrically therewith and shiftable to first present the paper to be typewritten along a certain line and then to present the paper to be amount-printed along the same line, and means for so shifting the cradle as an accompaniment to an operation of the amount-printing devices.

56. The combination with typewriting means striking in one direction and amount-printing means striking in a different direction, of a laterally shifting paper carriage, a roller platen therein, and a cradle for said platen mounted concentrically therewith and shiftable to first present the paper to be typewritten along a certain line and then to present the paper to be amount-printed along the same line, and means for so shifting the cradle as an accompaniment to an operation of the amount-printing devices.

57. The combination with typewriting means striking in one direction, and amount printing means striking in a different direction, of a roller platen, and a cradle therefor mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices.

58. The combination with typewriting means striking in one direction and amount printing means striking in a different direction, of a laterally shifting paper carriage, a roller platen therein, and a cradle for said platen mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices.

59. The combination with typewriting means striking in one direction and amount-printing means striking in a different direction, of a roller platen, and a cradle therefor shiftable to first present the paper to be typewritten along a certain line and then to present the paper to be amount-printed along the same line and means for so shifting the cradle as an accompaniment to an operation of the amount-printing devices, with provisions for preventing such shifting when the roller platen is turned for line spacing.

60. The combination with front-strike typewriting means and amount-printing means striking in a different direction, of a roller platen, and a cradle therefor shiftable to first present the paper to be typewritten along a certain line and then to present the paper to be amount-printed along the same line and means for so shifting the cradle as an accompaniment to an operation of the amount-printing devices, with provisions for preventing such shifting when the roller-platen is turned for line spacing.

61. The combination with typewriting means striking in one direction and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices with provisions for preventing such shifting when the roller platen is turned for line spacing.

62. The combination with front-strike typewriting means and amount-printing means striking in a different direction, of a laterally shifting paper carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices with provisions for preventing such shifting when the roller platen is turned for line spacing.

63. The combination with typewriting means striking in one direction, and amount-printing means striking in a different direction, of a roller platen, and a cradle therefor mounted concentrically therewith and shiftable to first present the paper to be typewritten along a certain line and then to present the paper to be amount-printed along the same line, and means for so shifting the cradle as an accompaniment to an operation of the amount-printing devices with provisions for preventing such shifting when the roller platen is turned for line spacing.

64. The combination with typewriting means striking in one direction and amount-printing means striking in a different direction, of a laterally shifting paper-carriage, a roller platen therein, and a cradle for said platen mounted concentrically therewith and shiftable to first present the paper to be typewritten along a certain line and then to present the paper to be amount-printed along the same line, and means for so shifting the cradle as an accompaniment to an operation of the amount-printing devices with provisions for preventing such shifting when the roller platen is turned for line spacing.

65. The combination with typewriting means striking in one direction, and amount-printing means striking in a different direction, of a roller platen, and a cradle therefor mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices with provisions for preventing such shifting when the roller platen is turned for line spacing.

66. The combination with typewriting means striking in one direction and amount-printing means striking in a different direction, of a laterally shifting paper carriage, a roller platen therein, and a cradle for said platen mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices with provisions for preventing such shifting when the roller platen is turned for line spacing.

67. The combination with typewriting means striking in one direction and amount-printing means striking in a different direction, of paper-supporting means shiftable to first present the paper to be typewritten along a certain line and then to present the paper to be amount-printed along the same line and means for so shifting the paper-supporting means as an accompaniment to an operation of the amount-printing devices, the same comprising an operating rock-shaft and a pitman connected therewith and to the paper-supporting means.

68. The combination with front-strike typewriting means and amount-printing means striking in a different direction, of paper-supporting means shiftable to first present the paper to be typewritten along a certain line and then to present the paper to be amount-printed along the same line and means for so shifting the paper-supporting means as an accompaniment to an operation of the amount-printing devices, the same comprising an operating rock-shaft and a pitman connected therewith and to the paper-supporting means.

69. The combination with typewriting means striking in one direction and amount-printing means striking in a different direction, of a paper-supporting platen shiftable to first present the paper to be typewritten along a certain line and then to present the paper to be amount-printed along the same line and means for so shifting the paper-supporting platen as an accompaniment to an operation of the amount-printing devices, the same comprising an operating rock-shaft and a pitman connected therewith and to the paper-supporting platen.

70. The combination with front-strike typewriting means and amount-printing means striking in a different direction, of a paper-supporting platen shiftable to first present the paper to be typewritten along a certain line and then to present the paper to be amount-printed along the same line and means for so shifting the paper-supporting platen as an accompaniment to an operation of the amount-printing devices, the same comprising an operating rock-shaft and a pitman connected therewith and to the paper-supporting platen.

71. The combination with typewriting means striking in one direction and amount-printing means striking in a different direction, of a laterally shifting paper-carriage, and paper-supporting means shiftable therein to first present the paper to be typewritten along a certain line and then to present the paper to be amount-printed along the same line and means for so shifting the paper-supporting means as an accompaniment to an operation of the amount-printing devices, the same comprising an operating rock-shaft and a pitman connected to the paper-supporting means and to the rock-shaft with provisions for lateral shift in the connections.

72. The combination with front-strike typewriting means and amount-printing means striking in a different direction, of a laterally shifting paper-carriage, and paper-supporting means shiftable therein to first present the paper to be typewritten along a certain line and then to present the paper to be amount-printed along the same line and means for so shifting the paper-supporting means as an accompaniment to an operation of the amount-printing devices, the same comprising an operating rock-shaft and a pitman connected to the paper-supporting means and to the rock-shaft with provisions for lateral shift in the connections.

73. The combination with typewriting means striking in one direction and amount-printing means striking in a different direction, of a laterally shifting paper-carriage, and a paper-supporting platen shiftable therein to first present the paper to be typewritten along a certain line and then to present the paper to be amount-printed along the same line and means for so shifting the paper-supporting platen as an accompaniment to an operation of the amount-printing devices, the same comprising an operating rock-shaft and a pitman connected to the paper-supporting platen and to the rock-shaft with provisions for lateral shift in the connections.

74. The combination with front-strike typewriting means and amount-printing means striking in a different direction, of a laterally shifting paper-carriage, and a paper-supporting platen shiftable therein to first present the paper to be typewritten along a certain line and then to present the paper to be amount-printed along the same line and means for so shifting the paper-supporting platen as an accompaniment to an operation of the amount-printing devices, the same comprising an operating rock-shaft and a pitman connected to the paper-supporting platen and to the rock-shaft with provisions for lateral shift in the connections.

75. The combination with typewriting means striking in one direction and amount-printing means striking in a different direction, of paper-supporting means rotatable to first present the paper to be typewritten along a certain line and then to present the paper to be amount-printed along the same line and means for so rotating the paper-supporting means as an accompaniment to an operation of the amount-printing devices, the same comprising an operating rock-shaft and a pitman connected therewith and to the paper-supporting means.

76. The combination with front-strike typewriting means and amount-printing means striking in a different direction, of paper-supporting means rotatable to first present the paper to be typewritten along a certain line and then to present the paper to be amount-printed along the same line and means for so rotating the paper-supporting means as an accompaniment to an operation of the amount-printing devices, the same comprising an operating rock-shaft and a pitman connected therewith and to the paper-supporting means.

77. The combination with typewriting means striking in one direction and amount-printing means striking in a different direction, of a paper-supporting platen rotatable to first present the paper to be typewritten along a certain line and then to present the paper to be amount-printed along the same line and means for so rotating the paper-supporting platen as an accompaniment to an operation of the amount-printing devices, the same comprising an operating rock-shaft and a pitman connected therewith and to the paper-supporting platen.

78. The combination with front-strike typewriting means and amount-printing means striking in a different direction, of a paper-supporting platen rotatable to first present the paper to be typewritten along a certain line and then to present the paper to be amount-printed along the same line and means for so rotating the paper-supporting platen as an accompaniment to an operation of the amount-printing devices, the same comprising an operating rock-shaft and a pitman connected therewith and to the paper-supporting platen.

79. The combination with typewriting means striking in one direction and amount-printing means striking in a different direction, of a laterally shifting paper-carriage, and paper-supporting means rotatable therein to first present the paper to be typewritten along a certain line and then to present the paper to be amount-printed along the same line and means for so rotating the paper-supporting means as an accompaniment to an operation of the amount-printing devices, the same comprising an operating rock-shaft and a pitman connected with the paper-supporting means and to the rock-shaft with provisions for lateral shift in the connections.

80. The combination with front-strike typewriting means and amount-printing means striking in a different direction, of a laterally shifting paper-carriage, and paper-supporting means rotatable therein to first present the paper to be typewritten along a certain line and then to present the paper to be amount-printed along the same line and means for so rotating the paper-supporting means as an accompaniment to an operation of the amount-printing devices, the same comprising an operating rock-shaft and a pitman connected with the paper-supporting means and to the rock-shaft with provisions for lateral shift in the connections.

81. The combination with typewriting means striking in one direction and amount-printing means striking in a different direction, of a laterally shifting paper-carriage, and a paper-supporting platen rotatable therein to first present the paper to be typewritten along a certain line and then to present the paper to be amount-printed along the same line and means for so rotating the paper-supporting platen as an accompaniment to an operation of the amount-printing devices, the same comprising an operating rock-shaft and a pitman connected with the paper-supporting platen and to the rock-shaft with provisions for lateral shift in the connections.

82. The combination with front-strike typewriting means and amount-printing means striking in a different direction, of a laterally shifting paper-carriage, and a paper-supporting platen rotatable therein to first present the paper to be typewritten along a certain line and then to present the paper to be amount-printed along the same line and means for so rotating the paper-supporting platen as an accompaniment to an operation of the amount-printing devices, the same comprising an operating rock-shaft and a pitman connected with the paper-supporting platen and to the rock-shaft with provisions for lateral shift in the connections.

83. The combination with typewriting means striking in one direction and amount-printing means striking in a different direction, of a paper-supporting roller platen shiftable to first present the paper to be type-written along a certain line and then to present the paper to be amount-printed along the same line and means for so shifting the roller platen as an accompaniment to an operation of the amount-printing devices, the same comprising an operating rock-shaft and a pitman connected therewith and to the roller platen.

84. The combination with front-strike typewriting means and amount-printing means striking in a different direction, of a paper-supporting roller platen shiftable to first present the paper to be typewritten along a certain line and then to present the paper to be amount-printed along the same line and means for so shifting the roller platen as an accompaniment to an operation of the amount-printing devices, the same comprising an operating rock-shaft and a pitman connected therewith and to the roller platen.

85. The combination with typewriting means striking in one direction and amount-printing means striking in a different direction, of a laterally shifting paper-carriage, and a paper-supporting roller platen shiftable therein to first present the paper to be typewritten along a certain line and then to present the paper to be amount-printed along the same line and means for so shifting the roller platen as an accompaniment to an operation of the amount-printing devices, the same comprising an operating rock-shaft and a pitman connected therewith and to the roller platen.

86. The combination with front-strike typewriting means and amount-printing means striking in a different direction, of a laterally shifting paper-carriage, and a paper-supporting roller platen shiftable therein to first present the paper to be typewritten along a certain line and then to present the paper to be amount-printed along the same line and means for so shifting the roller platen as an accompaniment to an operation of the amount-printing devices, the same comprising an operating rock-shat and a pitman connected therewith and to the roller platen.

87. The combination with typewriting means striking in one direction and amount-printing means striking in a different direction, of a paper-supporting platen shiftable on its own axis to first present the paper to be typewritten along a certain line and then to present the paper to be amount-printed along the same line and means for so shifting the roller platen as an accompaniment to an operation of the amount-printing devices, the same comprising an operating rock-shaft and a pitman connected therewith and to the roller platen.

88. The combination with front-strike typewriting means and amount-printing means striking in a different direction, of a paper-supporting roller platen shiftable on its own axis to first present the paper to be typewritten along a certain line and then to present the paper to be amount-printed along the same line and means for so shifting the roller platen as an accompaniment to an operation of the amount-printing devices, the same comprising an operating rock-shaft and a pitman connected therewith and to the roller platen.

89. The combination with typewriting means striking in one direction and amount-printing means striking in a different direction, of a laterally shifting paper-carriage, and a paper-supporting roller platen shiftable on its own axis therein to first present the paper to be typewritten along a certain line and then to present the paper to be amount-printed along the same line and means for so shifting the roller platen as an accompaniment to an operation of the amount-printing devices, the same comprising an operating rock-shaft and a pitman connected therewith and to the roller platen.

90. The combination with front-strike typewriting means and amount-printing means striking in a different direction, of a laterally shifting paper-carriage, and a paper-supporting roller platen shiftable on its own axis therein to first present the paper to be typewritten along a certain line and then to present the paper to be amount-printed along the same line and means for so shifting the roller platen as an accompaniment to an operation of the amount-printing devices, the same comprising an operating rock-shaft and a pitman connected therewith and to the roller platen.

91. The combination with typewriting means striking in one direction and amount-printing means striking in a different direction, of a roller platen, and a cradle therefor shiftable to first present the paper to be typewritten along a certain line and then to present the paper to be amount-printed along the same line and means for so shifting the cradle as an accompaniment to an operation of the amount-printing devices, the same comprising an operating rock-shaft and a pitman connected therewith and to the cradle.

92. The combination with front-strike typewriting means and amount-printing means striking in a different direction, of a roller platen, and a cradle therefor shiftable to first present the paper to be typewritten along a certain line and then to present the paper to be amount-printed along the same line and means for so shifting the cradle as an accompaniment to an operation of the amount-printing devices, the same comprising an operating rock-shaft and a pitman connected therewith and to the cradle.

93. The combination with typewriting means striking in one direction and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising an operating rock-shaft and a pitman connected therewith and to the cradle.

94. The combination with front-strike typewriting means and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising an operating rock-shaft and a pitman connected therewith and to the cradle.

95. The combination with typewriting means striking in one direction, and amount-printing means striking in a different direction, of a roller platen, and a cradle therefor mounted concentrically therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft and a pitman connected therewith and to the cradle.

96. The combination with typewriting means striking in one direction and amount-printing means striking in a different direction, of a laterally shifting paper-carriage, a roller platen therein, and a cradle for said platen mounted concentrically therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft and a pitman connected therewith and to the cradle.

97. The combination with typewriting means striking in one direction, and amount-printing means striking in a different direction, of a roller platen, and a cradle therefor mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft and a pitman connected therewith and to the cradle.

98. The combination with typewriting means striking in one direction and amount-printing means striking in a different direction, of a laterally shifting paper carriage, a roller platen therein, and a cradle for said platen mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft and a pitman connected therewith and to the cradle.

99. The combination with typewriting means striking in one direction and amount-printing means striking in a different direction, of a laterally shifting paper-carriage, and paper-supporting means shiftable therein to first present the paper to be typewritten along a certain line and then to present the paper to be amount-printed along the same line and means for so shifting the paper-supporting means as an accompaniment to an operation of the amount-printing devices, the same comprising an operating rock-shaft, a hanger connected therewith, a rock-frame slidingly engaged with the hanger, and a pitman connected with said frame and with the paper-supporting means.

100. The combination with front-strike typewriting means and amount-printing means striking in a different direction, of a laterally shifting paper-carriage, and paper-supporting means shiftable therein to first present the paper to be typewritten along a certain line and then to present the paper to be amount-printed along the same line and means for so shifting the paper-supporting means as an accompaniment to an operation of the amount-printing devices, the same comprising an operating rock-shaft, a hanger connected therewith, a rock-frame slidingly engaged with the hanger, and a pitman connected with said frame and with the paper-supporting means.

101. The combination with typewriting means striking in one direction and amount-printing means striking in a different direction, of a laterally shifting paper-carriage, and a paper-supporting platen shiftable therein to first present the paper to be typewritten along a certain line and then to present the paper to be amount-printed along the same line and means for so shifting the paper-supporting platen as an accompaniment to an operation of the amount-printing devices, the same comprising an operating rock-shaft, a hanger connected therewith, a rock-frame slidingly engaged with the hanger, and a pitman connected with said frame and with the paper-supporting platen.

102. The combination with front-strike typewriting means and amount-printing means striking in a different direction, of a laterally shifting paper-carriage, and a paper-supporting platen shiftable therein to first present the paper to be typewritten along a certain line and then to present the paper to be amount-printed along the same line and means for so shifting the paper-supporting platen as an accompaniment to an operation of the amount-printing devices, the same comprising an operating rock-shaft, a hanger connected therewith, a rock-frame slidingly engaged with the hanger, and a pitman connected with said frame and with the paper-supporting platen.

103. The combination with typewriting means striking in one direction and amount-printing means striking in a different direction, of a laterally shifting paper-carriage, and paper-supporting means rotatable therein to first present the paper to be typewritten along a certain line and then to present the paper to be amount-printed along the same line and means for so rotating the paper-supporting means as an accompaniment to an operation of the amount-printing devices, the same comprising an operating rock-shaft, a hanger connected therewith, a rock-frame slidingly engaged with the hanger, and a pitman connected with said frame and with the paper-supporting means.

104. The combination with front-strike typewriting means and amount-printing means striking in a different direction, of a laterally shifting paper-carriage, and paper-supporting means rotatable therein to first present the paper to be typewritten along a certain line and then to present the paper to be amount printed along the same line and means for so rotating the paper-supporting means as an accompaniment to an operation of the amount-printing devices, the same comprising an operating rock-shaft, a hanger connected therewith, a rock-frame slidingly engaged with the hanger, and a pitman connected with said frame and with the paper-supporting means.

105. The combination with typewriting means striking in one direction and amount-printing means striking in a different direction, of a laterally shifting paper-carriage, and a paper-supporting platen rotatable therein to first present the paper to be typewritten along a certain line and then to present the paper to be amount-printed along the same line and means for so rotating the paper-supporting platen as an accompaniment to an operation of the amount-printing devices, the same comprising an operating rock-shaft, a hanger connected therewith, a rock-frame slidingly engaged with the hanger, and a pitman connected with said frame and with the paper-supporting platen.

106. The combination with front-strike typewriting means and amount-printing means striking in a different direction, of a laterally shifting paper-carriage, and a paper-supporting platen rotatable therein to first present the paper to be typewritten along a certain line and then to present the paper to be amount-printed along the same line and means for so rotating the paper-supporting platen as an accompaniment to an operation of the amount-printing devices, the same comprising an operating rock-shaft, a hanger connected therewith, a rock-frame slidingly engaged with the hanger, and a pitman connected with said frame and with the paper-supporting platen.

107. The combination with typewriting means striking in one direction and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising an operating rock-shaft, a hanger connected therewith, a rock-frame slidingly engaged with the hanger, and a pitman connected with said frame and with the paper-supporting cradle.

108. The combination with front-strike typewriting means and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising an operating rock-shaft, a hanger connected therewith, a rock-frame slidingly engaged with the hanger, and a pitman connected with said frame and with the paper-supporting cradle.

109. The combination with typewriting means striking in one direction and amount-printing means striking in a different direction, of a laterally shifting paper-carrage, a roller platen therein, and a cradle for said platen mounted concentrically therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft, a hanger connected therewith, a rock-frame slidingly engaged with the hanger, and a pitman connected with said frame and with the paper-supporting cradle.

110. The combination with typewriting means striking in one direction and amount-printing means striking in a different direction, of a laterally shifting paper-carriage, a roller platen therein, and a cradle for said platen mounted concentrically and having frictional engagement therewith and shiftable to first present the paper to be type written along a certain line and then to present the paper to be amount-printed along the same line, and means for so shifting the cradle as an accompaniment to an operation of the amount-printing devices, the same comprising an operating rock-shaft, a hanger connected therewith, a rock-frame slidingly engaged with the hanger, and a pitman connected with said frame and with the paper-supporting cradle.

111. The combination with typewriting means striking in one direction and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising an operating rock-shaft, and a pitman connected therewith and having a wrist-pin engaging a slot in the carriage and a notch in the cradle.

112. The combination with front-strike typewriting means and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising an operating rock-shaft, and a pitman connected therewith and having a wrist-pin engaging a slot in the carriage and a notch in the cradle.

113. The combination with typewriting means striking in one direction and amount-printing means striking in a different direction, of a laterally shifting paper-carriage, a roller platen therein, and a cradle for said platen mounted concentrically therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft, and a pitman connected therewith and having a wrist-pin engaging a slot in the carriage and a notch in the cradle.

114. The combination with typewriting means striking in one direction and amount-printing means striking in a different direction, of a laterally shifting paper-carriage, a roller platen therein, and a cradle for said platen mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft, and a pitman connected therewith and having a wrist-pin engaging a slot in the carriage and a notch in the cradle.

115. The combination with typewriting means striking in one direction and amount-printing means striking in a different direction, of a roller platen, and a cradle therefor shiftable to first present the paper to be typewritten along a certain line and then to present the paper to be amount-printed along the same line and means for so shifting the cradle as an accompaniment to an operation of the amount-printing devices, the same comprising an operating rock-shaft and a pitman connected therewith and to the cradle with provisions for preventing movement of the pitman when the platen is turned for line-spacing.

116. The combination with front-strike typewriting means and amount-printing means striking in a different direction, of a roller platen, and a cradle therefor shiftable to first present the paper to be typewritten along a certain line and then to present the paper to be amount-printed along the same line and means for so shifting the cradle as an accompaniment to an operation of the amount-printing devices, the same comprising an operating rock-shaft and a pitman connected therewith and to the cradle, with provisions for preventing movement of the pitman when the platen is turned for line-spacing.

117. The combination with typewriting means striking in one direction and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising an operating rock-shaft and a pitman connected therewith and to the cradle with provisions for preventing movement of the pitman when the platen is turned for line-spacing.

118. The combination with front-strike typewriting means and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising an operating rock-shaft and a pitman connected therewith and to the cradle with provisions for preventing movement of the pitman when the platen is turned for line-spacing.

119. The combination with typewriting means striking in one direction, and amount-printing means striking in a different direction, of a roller platen, and a cradle therefor mounted concentrically therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft and a pitman connected therewith and to the cradle with provisions for preventing movement of the pitman when the platen is turned for line-spacing.

120. The combination with typewriting means striking in one direction and amount-printing means striking in a different direction, of a laterally shifting paper-carriage, a roller platen therein, and a cradle for said platen mounted concentrically therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft and a pitman connected therewith and to the cradle with provisions for preventing movement of the pitman when the platen is turned for line-spacing.

121. The combination with typewriting means striking in one direction, and amount-printing means striking in a different direction, of a roller platen, and a cradle therefor mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft and a pitman connected therewith and to the cradle with provisions for preventing movement of the pitman when the platen is turned for line-spacing.

122. The combination with typewriting means striking in one direction and amount-printing means striking in a different direction, of a laterally shifting paper-carriage, a roller platen therein, and a cradle for said platen mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft and a pitman connected therewith and to the cradle with provisions for preventing movement of the pitman when the platen is turned for line-spacing.

123. The combination with typewriting means striking in one direction and amount-printing means striking in a different direction, of a roller platen, and a cradle therefor shiftable to first present the paper to be typewritten along a certain line and then to present the paper to be amount-printed along the same line and means for so shifting the cradle as an accompaniment to an operation of the amount-printing devices, the same comprising an operating rock-shaft and a normally locked pitman connected therewith and to the cradle with provisions for unlocking the pitman through the movement of said rock-shaft.

124. The combination with front-strike typewriting means and amount-printing means striking in a different direction, of a roller platen, and a cradle therefor shiftable to first present the paper to be typewritten along a certain line and then to present the paper to be amount-printed along the same line and means for so shifting the cradle as an accompaniment to an operation of the amount-printing devices, the same comprising an operating rock-shaft and a normally locked pitman connected therewith and to the cradle with provisions for unlocking the pitman through the movement of said rock-shaft.

125. The combination with typewriting means striking in one direction and amount-printing means striking in a different direction of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising an operating rock-shaft and a normally locked pitman connected therewith and to the cradle with provisions for unlocking the pitman through the movement of said rock-shaft.

126. The combination with front-strike typewriting means and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising an operating rock-shaft and a normally locked pitman connected therewith and to the cradle with provisions for unlocking the pitman through the movement of said rock-shaft.

127. The combination with typewriting means striking in one direction, and amount-printing means striking in a different direction, of a roller platen, and a cradle therefor mounted concentrically therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft and a normally locked pitman connected therewith and to the cradle with provisions for unlocking the pitman through the movement of said rock-shaft.

128. The combination with typewriting means striking in one direction and amount-printing means striking in a different direction, of a laterally shifting paper-carriage, a roller platen therein, and a cradle for said platen mounted concentrically therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft and a normally locked pitman connected therewith and to the cradle with provisions for unlocking the pitman through the movement of said rock-shaft.

129. The combination with typewriting means striking in one direction, and amount-printing means striking in a different direction, of a roller platen, and a cradle therefor mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft and a normally locked pitman connected therewith and to the cradle with provisions for unlocking the pitman through the movement of said rock-shaft.

130. The combination with typewriting means striking in one direction and amount-printing means striking in a different direction, of a laterally shifting paper-carriage, a roller platen therein, and a cradle for said platen mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices, the same comprising an operating rock-shaft and a normally locked pitman connected therewith and to the cradle with provisions for unlocking the pitman through the movement of said rock-shaft.

131. The combination with typewriting means striking in one direction and amount-printing means striking in a different direction, of a roller-platen, and a cradle therefor shiftable to first present the paper to be typewritten along a certain line and then to present the paper to be amount-printed along the same line and means for so shifting the cradle as an accompaniment to an operation of the amount-printing devices, the same comprising a pitman connected at one end with the cradle and normally confronting an abutment at its opposite end, and operating connections for said pitman with provisions for clearing it from said abutment.

132. The combination with front-strike typewriting means and amount-printing means striking in a different direction, of a roller platen, and a cradle therefor shiftable to first present the paper to be typewritten along a certain line and then to present the paper to be amount-printed along the same line and means for so shifting the cradle as an accompaniment to an operation of the amount-printing devices, the same comprising a pitman connected at one end with the cradle and normally confronting an abutment at its opposite end, and operating connections for said pitman with provisions for clearing it from said abutment.

133. The combination with typewriting means striking in one direction and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising a pitman connected at one end with the cradle and normally confronting an abutment at its opposite end, and operating connections for said pitman with provisions for clearing it from said abutment.

134. The combination with front-strike typewriting means and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising a pitman connected at one end with the cradle and normally confronting an abutment at its opposite end, and operating connections for said pitman with provisions for clearing it from said abutment.

135. The combination with typewriting means striking in one direction, and amount-printing means striking in a different direction, of a roller platen, and a cradle therefor mounted concentrically therewith and shiftable to first present the paper to be typewritten along a certain line and then to present the paper to be amount-printed along the same line, and means for so shifting the cradle as an accompaniment to an operation of the amount-printing devices, the same comprising a pitman connected at one end with the cradle and normally confronting an abutment at its opposite end, and operating connections for said pitman with provisions for clearing it from said abutment.

136. The combination with typewriting means striking in one direction and amount-printing means striking in a different direction, of a laterally shifting paper-carriage, a roller platen therein, and a cradle for said platen mounted concentrically therewith and shiftable to first present the paper to be typewritten along a certain line and then to present the paper to be amount-printed along the same line, and means for so shifting the cradle as an accompaniment to an operation of the amount-printing devices, the same comprising a pitman connected at one end with the cradle and normally confronting an abutment at its opposite end, and operating connections for said pitman with provisions for clearing it from said abutment.

137. The combination with typewriting means striking in one direction, and amount-printing means striking in a different direction, of a roller platen, and a cradle therefor mounted concentrically and having frictional engagement therewith and shiftable to first present the paper to be typewritten along a certain line and then to present the paper to be amount-printed along the same line and means for so shifting the cradle as an accompaniment to an operation of the amount-printing devices, the same comprising a pitman connected at one end with the cradle and normally confronting an abutment at its opposite end, and operating connections for said pitman with provisions for clearing it from said abutment.

138. The combination with typewriting means striking in one direction and amount-printing means striking in a different direction, of a laterally shifting paper-carriage, a roller platen therein, and a cradle for said platen mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices, the same comprising a pitman connected at one end with the cradle and normally confronting an abutment at its opposite end, and operating connections for said pitman with provisions for clearing it from said abutment.

139. The combination with typewriting means striking in one direction and amount-printing means striking in a different direction, of a roller-platen, and a cradle therefor shiftable to first present the paper to be typewritten along a certain line and then to present the paper to be amount-printed along the same line and means for so shifting the cradle as an accompaniment to an operation of the amount-printing devices, the same comprising a pitman connected at one end with the cradle and normally confronting an abutment at its opposite end, and a lever having a cam-slot-and-pin connection with said pitman.

140. The combination with front-strike typewriting means and amount-printing means striking in a different direction, of a roller platen, and a cradle therefor shiftable to first present the paper to be typewritten along a certain line and then to present the paper to be amount-printed along the same line and means for so shifting the cradle as an accompaniment to an operation of the amount-printing devices, the same comprising a pitman connected at one end with the cradle and normally confronting an abutment at its opposite end, and a lever having a cam-slot-and-pin connection with said pitman.

141. The combination with typewriting means striking in one direction and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising a pitman connected at one end with the cradle and normally confronting an abutment at its opposite end, and a lever having a cam-slot-and-pin connection with said pitman.

142. The combination with front-strike typewriting means and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising a pitman connected at one end with the cradle and normally confronting an abutment at its opposite end, and a lever having a cam-slot-and-pin connection with said pitman.

143. The combination with typewriting means striking in one direction, and amount-printing means striking in a different direction, of a roller platen, and a cradle therefor mounted concentrically therewith and shiftable to first present the paper to be typewritten along a certain line and then to present the paper to be amount-printed along the same line, and means for so shifting the cradle as an accompaniment to an operation of the amount-printing devices, the same comprising a pitman connected at one end with the cradle and normally confronting an abutment at its opposite end, and a lever having a cam-slot-and-pin connection with said pitman.

144. The combination with typewriting means striking in one direction and amount-printing means striking in a different direction, of a laterally shifting paper-carriage, a roller platen therein, and a cradle for said platen mounted concentrically therewith and shiftable to first present the paper to be typewritten along a certain line and then to present the paper to be amount-printed along the same line, and means for so shifting the cradle as an accompaniment to an operation of the amount-printing devices, the same comprising a pitman connected at one end with the cradle and normally confronting an abutment at its opposite end, and a lever having a cam-slot-and-pin connection with said pitman.

145. The combination with typewriting means striking in one direction, and amount-printing means striking in a different direction, of a roller platen, and a cradle therefor mounted concentrically and having frictional engagement therewith and shiftable to first present the paper to be typewritten along a certain line and then to present the paper to be amount-printed along the same line and means for so shifting the cradle as an accompaniment to an operation of the amount-printing devices, the same comprising a pitman connected at one end with the cradle and normally confronting an abutment at its opposite end, and a lever having a cam-slot-and-pin connection with said pitman.

146. The combination with typewriting means striking in one direction and amount-printing means striking in a different direction, of a laterally shifting paper-carriage, a roller platen therein, and a cradle for said platen mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices, the same comprising a pitman connected at one end with the cradle and normally confronting an abutment at its opposite end, and a lever having a cam-slot-and-pin connection with said pitman.

147. The combination with typewriting means striking in one direction and amount-printing means striking in a different direction, of a laterally shifting paper-carriage, and paper-supporting means shiftable therein to first present the paper to be typewritten along a certain line and then to present the paper to be amount-printed along the same line and means for so shifting the paper-supporting means as an accompaniment to an operation of the amount-printing devices, the same comprising a pitman connected at one end with the paper-supporting means and normally confronting an abutment on the carriage at the opposite end, a rock-frame having a cam-slot-and-pin connection with said pitman, and an operating rock-shaft connected with said frame with provisions for lateral shift.

148. The combination with front-strike typewriting means and amount-printing means striking in a different direction, of a laterally shifting paper-carriage, and paper-supporting means shiftable therein to first present the paper to be typewritten along a certain line and then to present the paper to be amount-printed along the same line and means for so shifting the paper-supporting means as an accompaniment to an operation of the amount-printing devices, the same comprising a pitman connected at one end with the paper-supporting means and normally confronting an abutment on the carriage at the opposite end, a rock-frame having a cam-slot-and-pin connection with said pitman, and an operating rock-shaft connected with said frame with provisions for lateral shift.

149. The combination with typewriting means striking in one direction and amount-printing means striking in a different direction, of a laterally shifting paper-carriage, and a paper supporting platen shiftable therein to first present the paper to be typewritten along a certain line and then to present the paper to be amount-printed along the same line and means for so shifting the paper-supporting platen as an accompaniment to an operation of the amount-printing devices, the same comprising a pitman connected at one end with the paper-supporting platen and normally confronting an abutment on the carriage at the opposite end, a rock-frame having a cam-slot-and-pin connection with said pitman, and an operating rock-shaft connected with said frame with provisions for lateral shift.

150. The combination with front-strike typewriting means and amount-printing means striking in a different direction, of a laterally shifting paper-carriage, and a paper-supporting platen shiftable therein to first present the paper to be typewritten along a certain line and then to present the paper to be amount-printed along the same line and means for so shifting the paper-supporting platen as an accompaniment to an operation of the amount-printing devices, the same comprising a pitman connected at one end with the paper-supporting platen and normally confronting an abutment on the carriage at the opposite end, a rock-frame having a cam-slot-and-pin connection with said pitman, and an operating rock-shaft connected with said frame with provisions for lateral shift.

151. The combination with typewriting means striking in one direction and amount-printing means striking in a different direction, of a laterally shifting paper-carriage, and paper-supporting means rotatable therein to first present the paper to be typewritten along a certain line and then to present the paper to be amount-printed along the same line and means for so rotating the paper-supporting means as an accompaniment to an operation of the amount-printing devices, the same comprising a pitman connected at one end with the paper-supporting means and normally confronting an abutment on the carriage at the opposite end, a rock-frame having a cam-slot-and-pin connection with said pitman, and an operating rock-shaft connected with said frame with provisions for lateral shift.

152. The combination with front-strike typewriting means and amount-printing means striking in a different direction, of a laterally shifting paper-carriage, and paper-supporting means rotatable therein to first present the paper to be typewritten along a certain line and then to present the paper to be amount-printed along the same line and means for so rotating the paper-supporting means as an accompaniment to an operation of the amount-printing devices, the same comprising a pitman connected at one end with the paper-supporting means and normally confronting an abutment on the carriage at the opposite end, a rock-frame having a cam-slot-and-pin connection with said pitman, and an operating rock-shaft connected with said frame with provisions for lateral shift.

153. The combination with typewriting means striking in one direction and amount-printing means striking in a different direction, of a laterally shifting paper-carriage, and a paper-supporting platen rotatable therein to first present the paper to be typewritten along a certain line and then to present the paper to be amount-printed along the same line and means for so rotating the paper-supporting platen as an accompaniment to an operation of the amount-printing devices, the same comprising a pitman connected at one end with the paper-supporting platen and normally confronting an abutment on the carriage at the opposite end, a rock-frame having a cam-slot-and-pin connection with said pitman, and an operating rock-shaft connected with said frame with provisions for lateral shift.

154. The combination with front-strike typewriting means and amount-printing means striking in a different direction, of a laterally shifting paper-carriage, and a paper-supporting platen rotatable therein to first present the paper to be typewritten along a certain line and then to present the paper to be amount-printed along the same line and means for so rotating the paper-supporting platen as an accompaniment to an operation of the amount-printing devices, the same comprising a pitman connected at one end with the paper-supporting platen and normally confronting an abutment on the carriage at the opposite end, a rock-frame having a cam-slot-and-pin connection with said pitman, and an operating rock-shaft connected with said frame with provisions for lateral shift.

155. The combination with typewriting means striking in one direction and amount-printing means striking in a different direction, of a laterally shifting paper-carriage a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising a pitman connected at one end with the paper-supporting cradle and normally confronting an abutment on the carriage at the opposite end, a rock-frame having a cam-slot-and-pin connection with said pitman, and an operating rock-shaft connected with said frame with provisions for lateral shift.

156. The combination with front-strike typewriting means and amount-printing means striking in a different direction, of a laterally shifting paper-carriage, a roller platen therein, and a cradle for said platen shiftable to first present the paper to be typewritten along a certain line and then to present the paper to be amount-printed along the same line and means for so shifting the cradle as an accompaniment to an operation of the amount-printing devices, the same comprising a pitman connected at one end with the paper-supporting cradle and normally confronting an abutment on the carriage at the opposite end, a rock-frame having a cam-slot-and-pin connection with said pitman, and an operating rock-shaft connected with said frame with provisions for lateral shift.

157. The combination with typewriting means striking in one direction and amount-printing means striking in a different direction, of a laterally shifting paper-carriage, a roller platen therein, and a cradle for said platen mounted concentrically therewith and shiftable to first present the paper to be typewritten along a certain line and then to present the paper to be amount-printed along the same line, and means for so shifting the cradle as an accompaniment to an operation of the amount-printing devices, the same comprising a pitman connected at one end with the paper-supporting cradle and normally confronting an abutment on the carriage at the opposite end, a rock-frame having a cam-slot-and-pin connection with said pitman, and an operating rock-shaft connected with said frame with provisions for lateral shift.

158. The combination with typewriting means striking in one direction and amount-printing means striking in a different direction, of a laterally shifting paper-carriage, a roller platen therein, and a cradle for said platen mounted concentrically and having frictional engagement therewith and shiftable to first present the paper to be typewritten along a certain line and then to present the paper to be amount-printed along the same line, and means for so shifting the cradle as an accompaniment to an operation of the amount-printing devices, the same comprising a pitman connected at one end with the paper-supporting cradle and normally confronting an abutment on the carriage at the opposite end, a rock-frame having a cam-slot-and-pin connection with said pitman, and an operating rock-shaft connected with said frame with provisions for lateral shift.

159. The combination with front-strike typewriting mechanism including keys, typebars, roller platen and laterally shifting paper-carriage; of bottom-strike amount-printing mechanism, and means for shifting the platen to first present the paper to be typewritten along a line facing the operator and visible to him and then to be amount-printed all on the same line.

160. The combination with front-strike typewriting mechanism including keys, typebars, roller platen and laterally shifting paper-carriage; of bottom-strike amount-printing mechanism comprising a plurality of type-carriers each having a set of denominational type and each differentially movable beneath the platen to bring to the printing line different numerals to make up various amounts, keys for limiting the movement of said type-carriers, and means for effecting movement thereof as controlled by said keys and for producing printed impressions of amounts so set up.

161. The combination with a superposed platen, of type-carriers lying below and extending in rear thereof and adapted to be advanced in varying degree to bring the proper type to the printing line, hammers extending beneath the carriers and pivotally mounted in rear thereof, spring actuated drivers for said hammers, means for cocking said drivers, and means for tripping the same.

162. The combination with differentially movable type-carriers, of swinging hammers for taking impressions therefrom, the same having bifurcated portions, hammer drivers entering the bifurcations and having rocking engagement therewith, and means for actuating the drivers.

163. The combination with differentially movable type-carriers, of swinging hammers for taking impressions therefrom, the same having bifurcated portions, hammer drivers entering the bifurcations and having curved edges lying in contact with heels of said hammers at one side of the bifurcations, and means for actuating the drivers to first rock them on said hammer heels and then drive the hammers against the type.

164. The combination with the movable type-carriers and the hammers for taking impressions therefrom, of triggers holding the hammers normally retracted, and means controlled by the type-carriers for establishing fulcrums for the triggers to displace the same and release the hammers.

165. The combination with the movable type-carriers and the hammers for taking impressions therefrom, of triggers holding the hammers normally retracted, and means controlled by the type-carriers for establishing fulcrums for the triggers to displace the same and release the hammers with provisions for fulcrumizing triggers to the right of any affected by movement of type-carriers without requiring movement of the type-carriers of those triggers to the right.

166. The combination with the movable type-carriers and the hammers for taking impressions therefrom, of hammer drivers, triggers holding the hammers normally retracted, by engagement with said hammer drivers, and means controlled by the type-carriers for establishing fulcrums for the triggers to displace the same and release the hammer drivers.

167. The combination with the movable type-carriers and the hammers for taking impressions therefrom, of hammer drivers, triggers holding the hammers normally retracted, by engagement with said hammer drivers, and means controlled by the type-carriers for establishing fulcrums for the triggers to displace the same and release the hammer drivers with provisions for fulcrumizing triggers to the right of any affected by movement of type-carriers without requiring movement of the type-carriers of those triggers to the right.

168. The combination with the movable type-carriers and swinging hammers for taking impressions therefrom; of pivoted hammer drivers, a vibrating frame, triggers pivotally mounted on the latter and normally engaging the hammer drivers, means for restoring the latter against spring pressure, and catches engaging the type-carriers and normally disengaged from the triggers but adapted upon movement of said type-carriers to establish fulcrums for the triggers; substantially as and for the purpose described.

169. The combination with the movable type-carriers and swinging hammers for taking impressions therefrom; of pivoted hammer drivers, a vibrating frame, triggers pivotally mounted at one end on the latter and normally engaging the hammer drivers at the opposite ends, means for restoring the hammer drivers against spring pressure, and catches engaging the type-carriers and normally disengaged from the triggers but adapted upon movement of said type-carriers to establish fulcrums for the triggers by engaging the middle portions thereof; substantially as and for the purpose described.

170. The combination with the movable type-carriers and swinging hammers for taking impressions therefrom, of pivoted hammer drivers, a vibrating frame, triggers pivotally mounted on the latter and normally engaging the hammer drivers, means for restoring the latter against spring pressure, and catches engaging the type-carriers and normally disengaged from the triggers but adapted upon movement of said type-carriers to establish fulcrums for the triggers, said triggers having lateral projections for engagement with said catches and tangs extending under the lateral projections of neighboring triggers; substantially as and for the purpose described.

171. The combination with the movable type-carriers and swinging hammers for taking impressions therefrom; of pivoted hammer drivers, a vibrating frame, triggers pivotally mounted at one end on the latter and normally engaging the hammer drivers at the opposite ends, means for restoring the hammer drivers against spring pressure, and catches engaging the type-carriers and normally disengaged from the triggers but adapted upon movement of said type-carriers to establish fulcrums for the triggers by engaging the middle portions thereof, said triggers having lateral projections for engagement with said catches and tangs extending under the lateral projections of neighboring triggers; substantially as and for the purpose described.

172. The combination with the movable type-carriers and swinging hammers for taking impressions therefrom; of spring actuated two-legged pivoted hammer drivers, a vibrating frame, triggers pivotally mounted on the latter and normally engaging the hind legs of the hammer drivers, a restoring frame engaging the front legs of the hammer drivers, and catches engaging the type-carriers and normally disengaged from the triggers but adapted upon movement of said type-carriers to establish fulcrums for the triggers; substantially as and for the purpose described.

173. The combination with the movable type-carriers and swinging hammers for taking impressions therefrom; of spring actuated two-legged pivoted hammer drivers, a vibrating frame, triggers pivotally mounted at one end on the latter and normally engaging the hind legs of the hammer drivers at the opposite ends, a restoring frame engaging the front legs of the hammer drivers, and catches engaging the type-carriers and normally disengaged from the triggers but adapted upon movement of said type-carriers to establish fulcrums for the triggers by engaging the middle portions thereof; substantially as and for the purpose described.

174. The combination with the movable type-carriers and swinging hammers for taking impressions therefrom; of pivoted hammer drivers, a vibrating frame, triggers pivotally mounted on the latter and normally engaging the hammer drivers, means for restoring the latter against spring pressure, and pivoted catches engaging the type-carriers and normally disengaged from the triggers but adapted upon movement of said type-carriers to establish fulcrums for the triggers; substantially as and for the purpose described.

175. The combination with the movable type-carriers and swinging hammers for taking impressions therefrom; of pivoted hammer drivers, a vibrating frame, triggers pivotally mounted at one end on the latter and normally engaging the hammer drivers at the opposite ends, means for restoring the hammer drivers against spring pressure, and pivoted catches engaging the type-carriers and normally disengaged from the triggers but adapted upon movement of said type-carriers to establish fulcrums for the triggers by engaging the middle portions thereof; substantially as and for the purpose described.

176. The combination with the movable type-carriers and swinging hammers for taking impressions therefrom; of pivoted hammer drivers, a vibrating frame, triggers pivotally mounted on the latter and normally engaging the hammer drivers, means for restoring the latter against spring pressure, pivoted catches engaging the type-carriers and normally disengaged from the triggers but adapted upon movement of said type-carriers to establish fulcrums for the triggers, and springs connecting the latter and the catches.

177. The combination with the movable type-carriers and swinging hammers for taking impressions therefrom; of pivoted hammer drivers, a vibrating frame, triggers pivotally mounted on the latter and normally engaging the hammer drivers, means for restoring the latter against spring pressure, and catches pivoted intermediate their ends engaging the type-carriers at one end and normally disengaged from the triggers at their other ends but adapted upon movement of said type-carriers to establish fulcrums for the triggers; substantially as and for the purpose described.

178. The combination with the movable type-carriers and swinging hammers for taking impressions therefrom; of pivoted hammer drivers, a vibrating frame, triggers pivotally mounted at one end on the latter and normally engaging the hammer drivers at the opposite ends, means for restoring the hammer drivers against spring pressure and catches pivoted intermediate their ends engaging the type-carriers at one end and normally disengaged from the triggers at their other ends but adapted upon movement of said type-carriers to establish fulcrums for the triggers by engaging the middle portions thereof; substantially as and for the purpose described.

179. The combination with the movable type-carriers and swinging hammers for taking impressions therefrom; of pivoted hammer drivers, a vibrating frame, triggers pivotally mounted on the latter and normally engaging the hammer drivers, means for restoring the latter against spring pressure, and catches pivoted intermediate their ends engaging the type-carriers at one end and normally disengaged from the triggers at their other ends but adapted upon movement of said type-carriers to establish fulcrums for the triggers, said triggers having lateral projections for engagement with said catches and tangs extending under the lateral projections of neighboring triggers; substantially as and for the purpose described.

180. The combination with the movable type-carriers and swinging hammers for taking impressions therefrom; of pivoted hammer drivers, a vibrating frame, triggers pivotally mounted at one end on the latter and normally engaging the hammer drivers at the opposite ends, means for restoring the hammer drivers against spring pressure and catches pivoted intermediate their ends engaging the type-carriers at one end and normally disengaged from the triggers at their other ends but adapted upon movement of said type-carriers to establish fulcrums for the triggers by engaging the middle portions thereof, said triggers having lateral projections for engagement with said catches and tangs extending under the lateral projections of neighboring triggers; substantially as and for the purpose described.

181. The combination with the movable type-carriers and swinging hammers for taking impressions therefrom; of spring actuated two-legged pivoted hammer drivers, a vibrating frame, triggers pivotally mounted on the latter and normally engaging the hind legs of the hammer drivers, a restoring frame engaging the front legs of the hammer drivers, and catches pivoted intermediate their ends engaging the type-carriers at one end and normally disengaged from the triggers at their other ends but adapted upon movement of said type-carriers to establish fulcrums for the triggers; substantially as and for the purpose described.

182. The combination with the movable type-carriers and swinging hammers for taking impressions therefrom; of spring actuated two-legged pivoted hammer drivers, a vibrating frame, triggers pivotally mounted at one end on the latter and normally engaging the hind legs of the hammer drivers at the opposite ends, a restoring frame engaging the front legs of the hammer drivers, and catches pivoted intermediate their ends engaging the type-carriers at one end and normally disengaged from the triggers at their other ends but adapted upon movement of said type-carriers to establish fulcrums for the triggers by engaging the middle portions thereof; substantially as and for the purpose described.

183. The combination with the movable type-carriers and swinging hammers for taking impressions therefrom; of pivoted hammer drivers, a vibrating frame, triggers pivotally mounted on the latter and normally engaging the hammer drivers, means for restoring the latter against spring pressure, catches pivoted intermediate their ends engaging the type-carriers at one end and normally disengaged from the triggers at their other ends but adapted upon movement of said type-carriers to establish fulcrums for the triggers and springs connecting the latter and the catches.

184. In a combined typewriting and amount recording and adding machine, character keys at the front of the machine having operating connections extending rearward at the lower part of the machine, type bars operated by said connections, amount keys arranged between said type bars and the character keys, and amount type carriers in rear of the type bars and controlled by said amount keys.

185. In a combined typewriting and amount recording and adding machine, character keys at the front of the machine having operating connections extending rearward at the lower part of the machine, type bars operated by said connections, amount keys arranged between said type bars and the character keys, differentially movable actuators arranged above said connections and below the amount keys and controlled by the latter, and amount type carriers in rear of the type bars and connected to said actuators.

186. In a combined typewriting and amount recording and adding machine, character keys at the front of the machine having operating connections extending rearward at the lower part of the machine, type bars operated by said connections, amount keys arranged between said type bars and the character keys, differentially movable actuators arranged above said connections and below the amount keys and controlled by the latter, amount type carriers in rear of the type bars and connected to said actuators, and adding wheels operated by the latter and visible between the character and amount keys.

GLENN J. BARRETT.

Witnesses:
 GEO. M. BLOWERS,
 LINWOOD A. MURRAY.